United States Patent [19]
Okada

[11] Patent Number: 5,263,375
[45] Date of Patent: Nov. 23, 1993

[54] CONTACT DETECTOR USING RESISTANCE ELEMENTS AND ITS APPLICATION

[75] Inventor: Kazuhiro Okada, Ageo, Japan
[73] Assignee: Wacoh Corporation, Ageo, Japan
[21] Appl. No.: 765,588
[22] Filed: Sep. 25, 1991

Related U.S. Application Data

[62] Division of Ser. No. 362,399, Jun. 19, 1989, Pat. No. 5,092,645 filed as PCT/JP88/00930, Sep. 14, 1988.

[30] Foreign Application Priority Data

| Sep. 18, 1987 | [JP] | Japan | 62-234590 |
| Feb. 5, 1988 | [JP] | Japan | 63-25320 |
| Jun. 11, 1988 | [JP] | Japan | 63-144380 |
| Sep. 18, 1988 | [JP] | Japan | 63-234589 |

[51] Int. Cl.$^5$ ............................................. G01L 3/00
[52] U.S. Cl. .......................... 73/862.042; 73/862.045; 73/862.637
[58] Field of Search ........... 73/862.04, 862.64, 862.68, 73/862.38, 862.54, 104, 105, 727, 862.044, 862.045, 286.042, 862.637, 862.381, 862.541, 862.627; 338/5

[56] References Cited

U.S. PATENT DOCUMENTS

| 3,509,583 | 5/1970 | Fraioli | 3/1.1 |
| 4,267,725 | 5/1981 | Roth et al. | 338/5 X |
| 4,320,667 | 3/1982 | Forrester et al. | 73/862.64 |
| 4,454,771 | 6/1984 | Shimazoe et al. | 73/862.68 |
| 4,573,362 | 3/1986 | Amlani | 73/862.04 |
| 4,680,606 | 7/1987 | Knutti et al. | 73/862.04 X |
| 4,836,034 | 6/1989 | Izumi et al. | 73/862.044 |

FOREIGN PATENT DOCUMENTS

| 0133997 | 3/1985 | European Pat. Off. |
| 3008441 | 9/1981 | Fed. Rep. of Germany |
| 3226386 | 1/1984 | Fed. Rep. of Germany |
| 2265135 | 1/1975 | France |

OTHER PUBLICATIONS

Patent Abstracts of Japan, vol. 10, No. 45, Detector For Measuring ... Pressure, P-430, Feb. 21, 1986.
Pat. Abs of Japan, vol. 7, No. 38 (P-176), Feb. 16, 1983 Pressure Converter & Manuf. Thereof.
Pat. Abs. of Japan, vol. 10, No. 256 (P-493) Sep. 2, 1986 Teaching Operation Device.
Transducers '85, ICS-S Sensor & Actuators, 1985, pp. 30-32; Force Sensing Chip for Robot ... Applications.
Proc. IECON '86, Int. Conf. Ind. Electr. Control & Instr. 1986, pp. 544-548; Three ... Dex Hands For ... Manipulter.
Pat. Abs. of Japan, vol. 10, No. 3 (P-418) Jan. 8, 1986 Sensation-of-Pressure Discrim. Control Apparatus.
Pat. Abs. of Japan, vol. 11, No. 58 (P-550), Feb. 21, 1987, Sensor.
Pat. Abs. of Japan, vol. 9, No. 6 (P-326), Jan. 11, 1985, Force Converter.
N.T.I.S. Tech. Notes, No. 2, part F. Feb. 1986, p. 188, Force Sensor for Large Robot Arms.

*Primary Examiner*—Richard E. Chilcot, Jr.
*Assistant Examiner*—Elizabeth L. Dougherty
*Attorney, Agent, or Firm*—Ladas & Parry

[57] ABSTRACT

There is disclosed an applied technology of an elementary sensor for sensing a force comprising a transducer for transforming a mechanical deformation to an electric signal, and a first strain generative body (20) including a supporting portion (21) and a working portion (23) connected to the transducer so as to allow the transducer to produce a mechanical deformation on the basis of a displacement relative to the supporting portion of the working portion. By further adding a second strain generative body (30) including a fixed portion (31) fixed at least with respect to the direction of a force to be detected, and a displacement portion (33) connected to the working portion of the first strain generative body, wherein the displacement portion is constructed to produce a displacement based on a given external force relative to the fixed portion to transmit the displacement thus produced to the working portion of the first strain generative body, a force detector applicable to a wide variety of measurement ranges can be realized. Moreover, by allowing the displacement portion to be elongated, a detector suitable for measurement of both force and moment can be provided. In addition, an embodiment to connect stylus (306) to the elementary sensor to apply it to a contact detector, and an embodiment to affix the elementary sensor at the hand of a robot to apply it to a gripper for robot are disclosed.

5 Claims, 28 Drawing Sheets

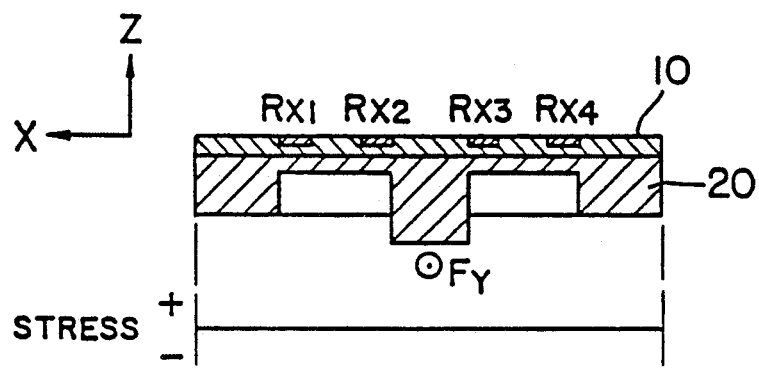
F I G. 5 (a)
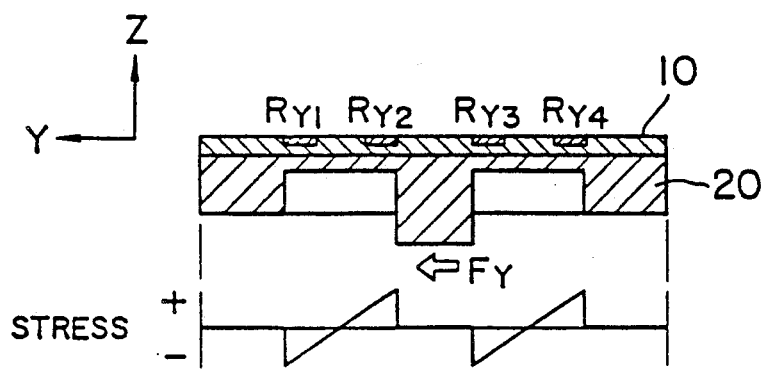
F I G. 5 (b)
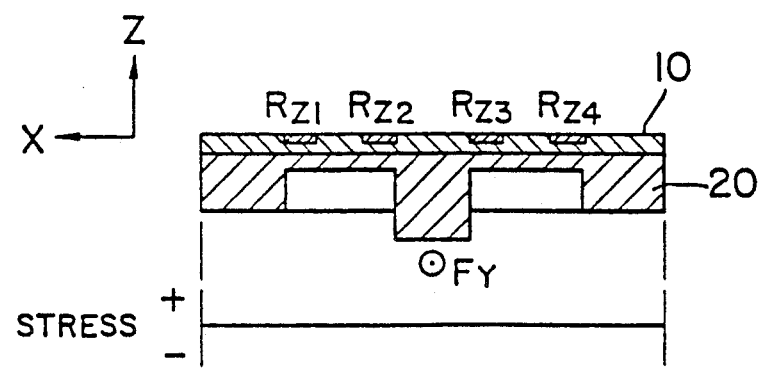
F I G. 5 (c)

| | R1 | R2 | R3 | R4 | R5 | R6 | R7 | R8 | R9 | R10 | R11 | R12 | R13 | R14 | R15 | R16 |
|---|---|---|---|---|---|---|---|---|---|---|---|---|---|---|---|---|
| Fx | − | + | + | − | + | − | − | + | + | + | + | + | − | − | − | − |
| Fy | + | + | + | + | − | − | − | − | + | − | − | + | − | + | + | − |
| Fz | + | − | + | − | − | + | − | + | + | − | + | − | − | + | − | + |
| Mx | + | − | + | − | + | − | + | − | 0 | 0 | 0 | 0 | 0 | 0 | 0 | 0 |
| My | 0 | 0 | 0 | 0 | 0 | 0 | 0 | 0 | + | − | + | − | + | − | + | − |
| Mz | − | + | + | − | − | + | + | − | − | + | + | − | − | + | + | − |

FIG. 10

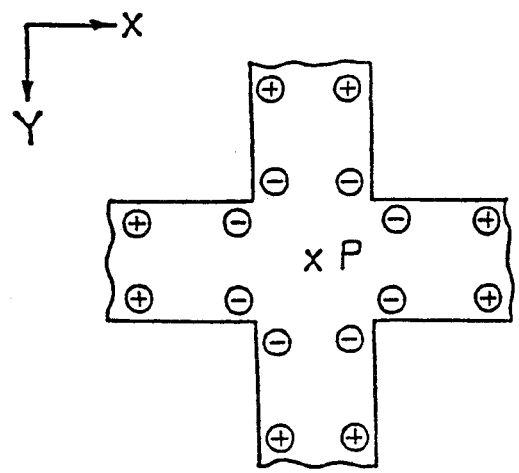
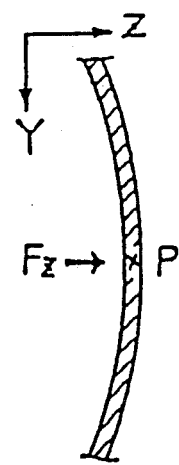
FIG. 13A  FIG. 13C
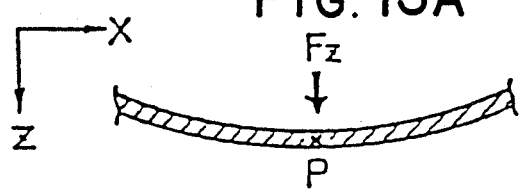
FIG. 13B
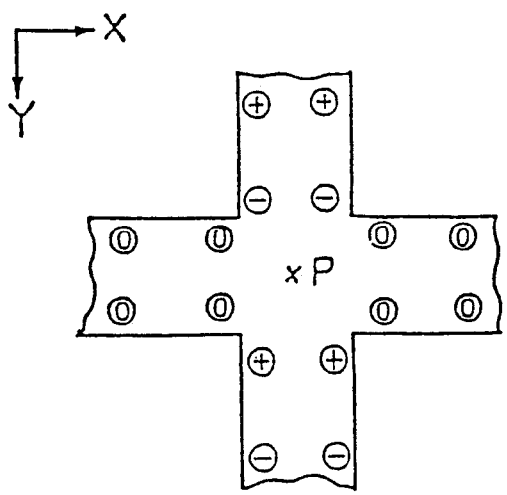
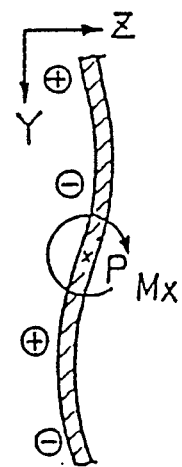
FIG. 14A  FIG. 14C
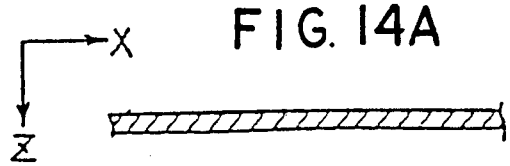
FIG. 14B

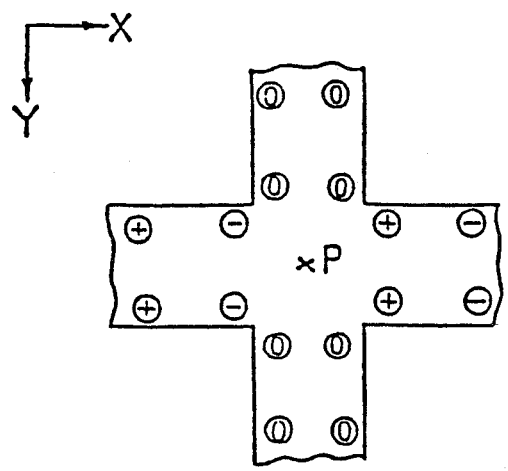
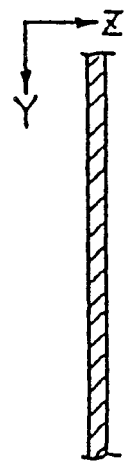
FIG. 15A  FIG. 15C
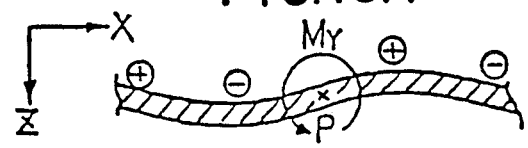
FIG. 15B
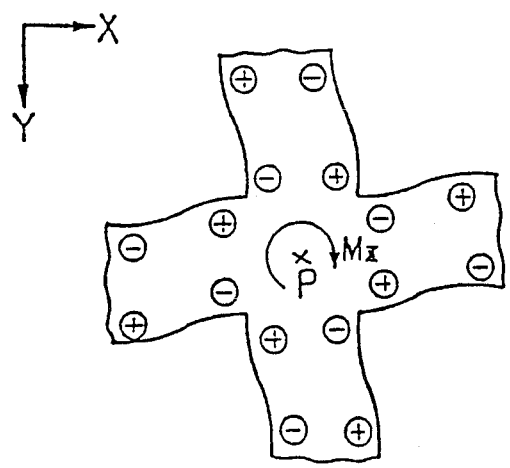
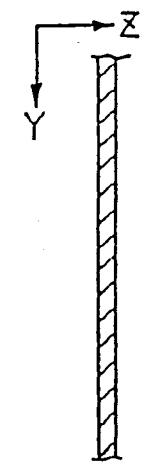
FIG. 16A  FIG. 16C
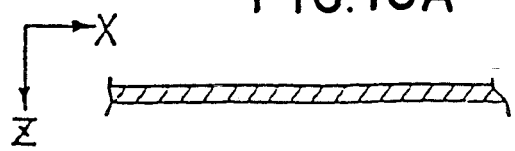
FIG. 16B

|     | $VF_X$ | $VF_Y$ | $VF_Z$ | $VM_X$ | $VM_Y$ | $VM_Z$ |
|-----|--------|--------|--------|--------|--------|--------|
| $F_X$ | V | 0 | 0 | 0 | 0 | 0 |
| $F_Y$ | 0 | V | 0 | 0 | 0 | 0 |
| $F_Z$ | 0 | 0 | V | 0 | 0 | 0 |
| $M_X$ | 0 | 0 | 0 | V | 0 | 0 |
| $M_Y$ | 0 | 0 | 0 | 0 | V | 0 |
| $M_Z$ | 0 | 0 | 0 | 0 | 0 | V |

FIG. 17

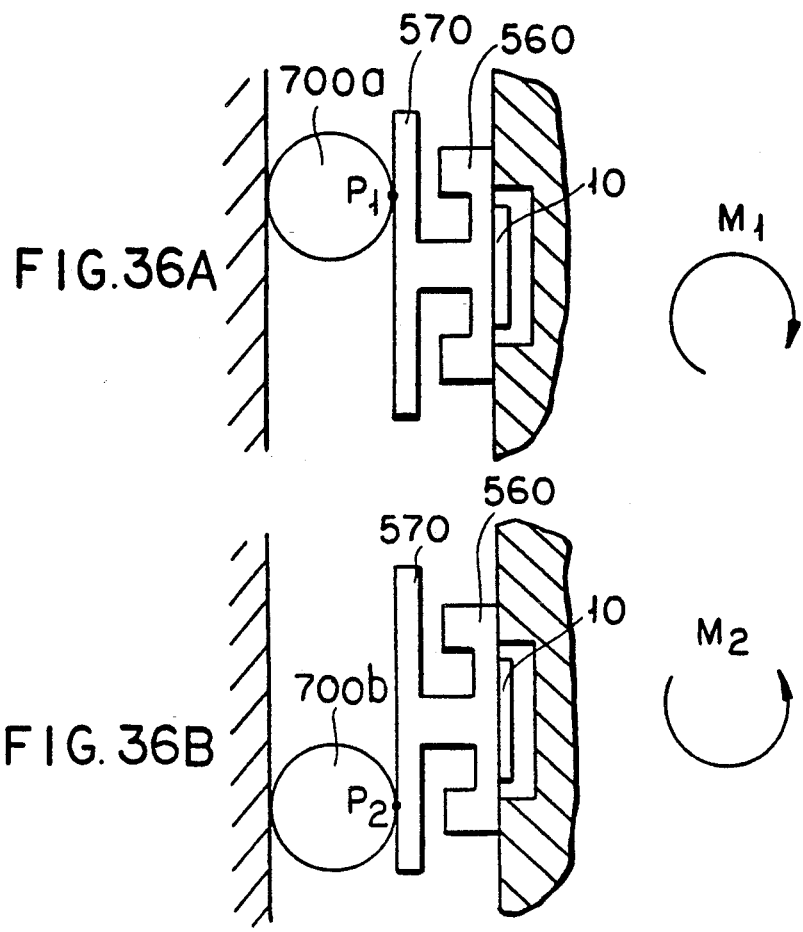
FIG.36A
FIG.36B
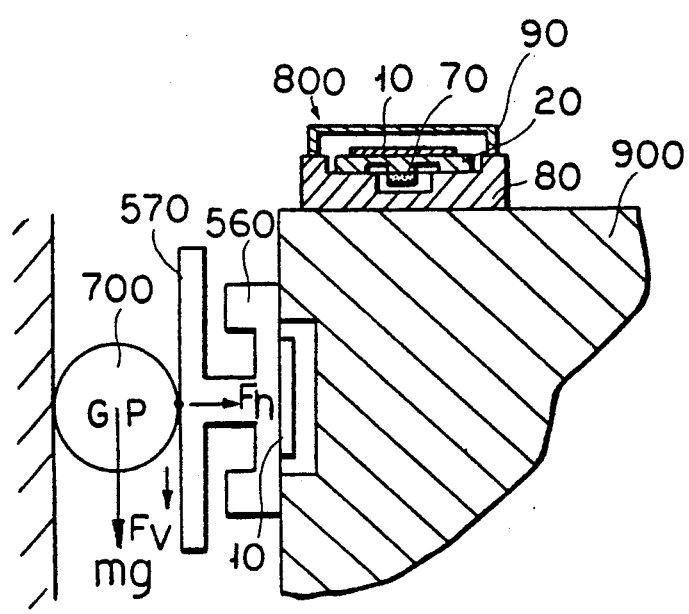
FIG.37

CONTACT DETECTOR USING RESISTANCE ELEMENTS AND ITS APPLICATION

This is a divisional of copending application Ser. No. 07/362,399 filed on Jun. 19, 1989 now U.S. Pat. No. 5,092,645 and International application PCT/JP88/00930 Sept. 14, 1988 and which designated the U.S.

DESCRIPTION

1. Technical Field

This invention relates to a force detector using resistance elements and its application, and more particularly to a force detector using resistance elements having piezo resistance effect formed on a single crystal substrate and its application.

2. Background Art

Under circumstances where automation of equipment is being developed, an importance has been increasingly attached to the role of sensors. Heretofore, force detectors generally used transform a stress-strain due to a force exerted thereon to a quantity of electricity by means of a strain gauge, etc. to thereby make a detection. Ordinarily, there are many instances where a strain gauge is stuck on a cantilever structure to make a force detection in a specific direction by the stress-strain of the cantilever.

Recently, semiconductor sensors have been devised as a new force and moment sensor. For example, several sensors of this kind are disclosed in the specifications of the Japanese patent applications Nos. 101267/87 to 01270/87. Such semiconductor sensors are suitable for miniaturization and mass production as compared to the sensors using strain gauge and a great demand therefor will be expected in future.

However, these conventional force detectors have the problem that it is difficult to apply them to a wide variety of measurement ranges. The detection range of the force detector may diversely change according to the use purpose. When detections of the load in a range of 0 to 1 Kg and the load in a range of 0 to 100 Kg are taken as an example, individual force detectors therefor must be manufactured, respectively. Accordingly, in the case of application to a wide variety of measurement ranges, mass-productivity and cost performance would be lowered with such conventional force detectors.

Further, the problem with the above-described semiconductor sensor is that the same semiconductor substrate cannot be used for both the force sensor and the moment sensor. Namely, the semiconductor substrate used for a product as the force sensor and the semiconductor substrate used for a product as the moment sensor must be manufactured separately from each other, resulting in the problem of the poor cost performance.

DISCLOSURE OF THE INVENTION

A first object of this invention is to provide a force detector which can be easily applied to a wide variety of measurement ranges.

A second object of this invention is to provide a force/moment detector in which the same substrate can be applied to both the force sensor and the moment sensor.

A third object of this invention is to provide a high precision contact detector by the application of such a force detector as mentioned above.

A fourth object of this invention is to provide a gripper for robot provided with a high precision touch sensor by the application such a force detector as mentioned above.

To achieve the above-described first object, this invention constitutes a force detector comprising: a transducer for transforming a mechanical deformation to an electric signal; a first strain generative body including a supporting portion and a working portion, and connected to the transducer so as to allow the transducer to produce a mechanical deformation on the basis of a displacement relative to the supporting portion of the working portion; and a second strain generative body including a fixed portion fixed to the supporting portion of the first strain generative body with respect to a direction of at least a force to be detected, and a displacement portion connected to the working portion of the first strain generative body, wherein the displacement portion produces a displacement based on a given external force relative to the fixed portion to transmit the displacement produced to the working portion of the first strain generative body.

In the force detector as constructed above, when an external force is applied to the displacement portion, the second strain generative body produces a strain and the displacement portion produces a displacement corresponding to an external force relative to the fixed portion. This displacement is transmitted to the working portion of the first strain generative body. Thus, the working portion produces a displacement relative to the supporting portion. By this displacement, a strain is produced also in the transducer, thus making it possible to electrically detect an applied force. When the transducer is formed by resistance elements formed on one surface of a single crystal substrate, the semiconductor substrate and the first strain generative body can be constituted planar, thus making it possible to satisfactorily connect to the second strain generative body similarly constructed planar.

The objective of this invention is to mass-produce the transducer and the first strain generative body in a manner such that they are commonly standardized and unified, and on the other hand, to manufacture many kinds of second strain generative bodies to selectively use such second strain generative bodies to thereby cope with a wide variety of measurement ranges. Manufacturing of plural kinds of transducers and first strain generative bodies connected thereto becomes expensive to much extent. However, in the case of the force detector according to this invention, it is sufficient to manufacture only one kind of the transducers and the first strain generative bodyies. Although plural kinds of second strain generative bodies must be manufactured according to the measurement ranges, since the second strain generative body is not directly connected to the transducer, ones of desired sizes can be manufactured using desired materials. Accordingly, as compared to the manufacture of plural kinds of transducers and first strain generative bodies, the manufacture of many kinds of such products is much easy.

To achieve the second object, this invention constitutes a force/moment detector comprising:
a transducer for transforming a mechanical deformation to an electric signal;
a strain generative body including a supporting portion and a working portion, and connected to the transducer so as to allow the transducer to produce a mechanical deformation on the basis of a displacement relative to the supporting portion of the working portion; and an arm like body having one end as an initial end connected to the working portion, and extending so that it is away from the transducer, the arm like body having the other end at its terminating end, wherein when a force is applied in a direction allowing the other end to conduct a sliding movement relative to the transducer, a moment force is produced at a point on the transducer, and when the moment force is applied in a direction allowing the other end to conduct a rotational movement relative to the point on the transducer, a force in a direction along the transducer is produced at the point.

In accordance with the above-described construction, a sensor is formed by the transducer and the strain generative body. This sensor can detect a force or a moment exerted on a point of the sensor surface on the basis of a strain of the strain generative body. For a sensor used for the detector according to this invention, it is sufficient to employ such a mechanism to detect only either a force or moment exerted on a point on the sensor surface. In the case of the mechanism for detecting force, the detector serves as a force sensor when used as it is, and the detector serves as a moment sensor when an arrangement provided with an arm like body is employed as in the detector according to this invention. On the other hand, in the case of the mechanism for detecting moment, the detector serves as a moment sensor when used as it is, and the detector serves as a force sensor when an arrangement provided with an arm like body is employed as in the detector according to this invention.

In short, when sensors capable of detecting only either force or moment are mass-produced, detection of the other can be made by additionally providing the arm like body thereto.

To achieve the third object, this invention constitutes a contact detector comprising:

force transformation means including a contact piece to come in contact with an object, and a strain generative body for transforming a force applied to the contact piece due to the contact with the body to a mechanical deformation;

a semiconductor substrate connected to the strain generative body, comprising resistance elements having a resistance value varying on the basis of a mechanical deformation transformed by the strain generative body, wherein the resistance elements are formed in an array so that the direction of a force applied to the contact piece can be recognized; and supporting means for supporting the strain generative body on the detector body.

In the contact detector constructed as described above, when a force is exerted or received as a result of the fact that the contact end of the contact piece comes in contact with an object, a mechanical deformation is given to a strain generative body by the force. The mechanical deformation that the strain generative body has undergone changes each resistance value of resistance elements arranged so as to recognize the direction of a force applied to the contact piece. By detecting the resistance value thus changed, the direction of a very small surface where the contact piece is in contact with the object can be recognized from the direction of the force applied to the contact end.

To achieve the fourth object, this invention constitutes a gripper for robot comprising a finger member for gripping a work and a hand member for movably supporting the finger member to move the finger member relative to the hand member to thereby grip the work, wherein a touch sensor comprising:

resistance elements having the piezo resistance effect that electric resistance changes due to a mechanical deformation, and formed on a single crystal substrate; and a strain generative body including a supporting portion and a working portion, thus to allow the resistance elements to produce a mechanical deformation on the basis of a displacement relative to the supporting portion of the working portion;

is provided at the finger member so that a displacement between the supporting portion and the working portion is produced by the gripping operation in the case of gripping a work, thus making it possible to detect the gripping state between the work and the finger member as a change of an electric resistance value of each resistance element.

The touch sensor constructed as described above is a sensor using a single crystal substrate such as a semiconductor. Accordingly, with respect to a force applied to the substrate, a very high accurate linear output is provided as an electric resistance value of the resistance element. Moreover, by devising an arrangement of resistance elements on the single crystal substrate, detection of all forces in the axial direction and all moments about the axis in the three-dimensional coordinate system can be made. For this reason, sufficient information relating to the gripping state of the work can be obtained. On the other hand, the single crystal substrate is not directly connected to the finger member, but is connected through the strain generative body. Accordingly, even when a large force necessary for the function as the gripper for robot is applied, there is no possibility that the single crystal substrate is broken.

BRIEF DESCRIPTION OF THE DRAWINGS

FIGS. 5(a), (b) and (c) are diagrams showing the stress distribution when force Fy is exerted on the elementary sensor shown in FIG. 1, respectively.

FIG. 10 is a table for explaining the operation of the six-component sensor shown in FIG. 7.

FIGS. 13(a), (b) and (c) are diagrams showing the mechanical deformation and the resistance value change when force Fz is applied to the six-component sensor shown in FIG. 7, respectively.

FIGS. 14(a), (b) and (c) are diagrams showing the mechanical deformation and the resistance value change when moment Mx is applied to the six-component sensor shown in FIG. 7, respectively.

FIGS. 15(a), (b) and (c) are diagrams showing the mechanical deformation and the resistance value change when moment My is applied to the six-component sensor shown in FIG. 7, respectively.

FIGS. 16(a), (b) and (c) are diagrams showing the mechanical deformation and the resistance value change when moment Mz is applied to the six-component sensor shown in FIG. 7, respectively.

FIG. 17 is a table showing the relationship between the value sensed and the voltage sensed in the six-component sensor shown in FIG. 7.

FIGS. 36(a) and (b) are views for explaining the operation of the gripper shown in FIG. 34.

FIG. 37 is a diagram for explaining the operation when an acceleration is exerted on the gripper shown in FIG. 34.

BEST MODE FOR CARRYING OUT THE INVENTION

§0 Elementary Sensor

Embodiments of four kinds of devices of the force detector, the force/moment detector, the contact detector, and the gripper for robot will be described in this specification. Prior to the description of these respective devices, the structure of an elementary sensor commonly used in these respective devices and the operation thereof will be described in detail.

0.1 Structure of the Elementary Sensor

Figure 1A:
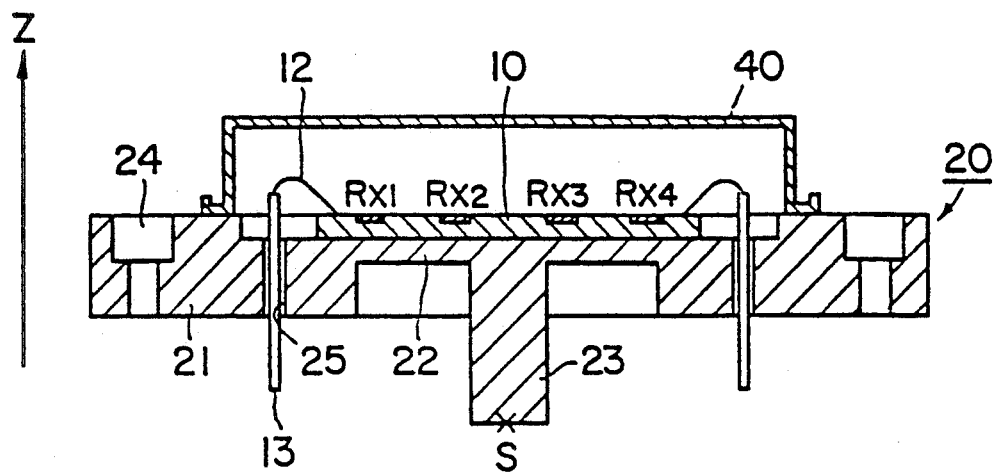
FIG. 1(a) is a cross sectional view of an elementary sensor.
Figure 1B:
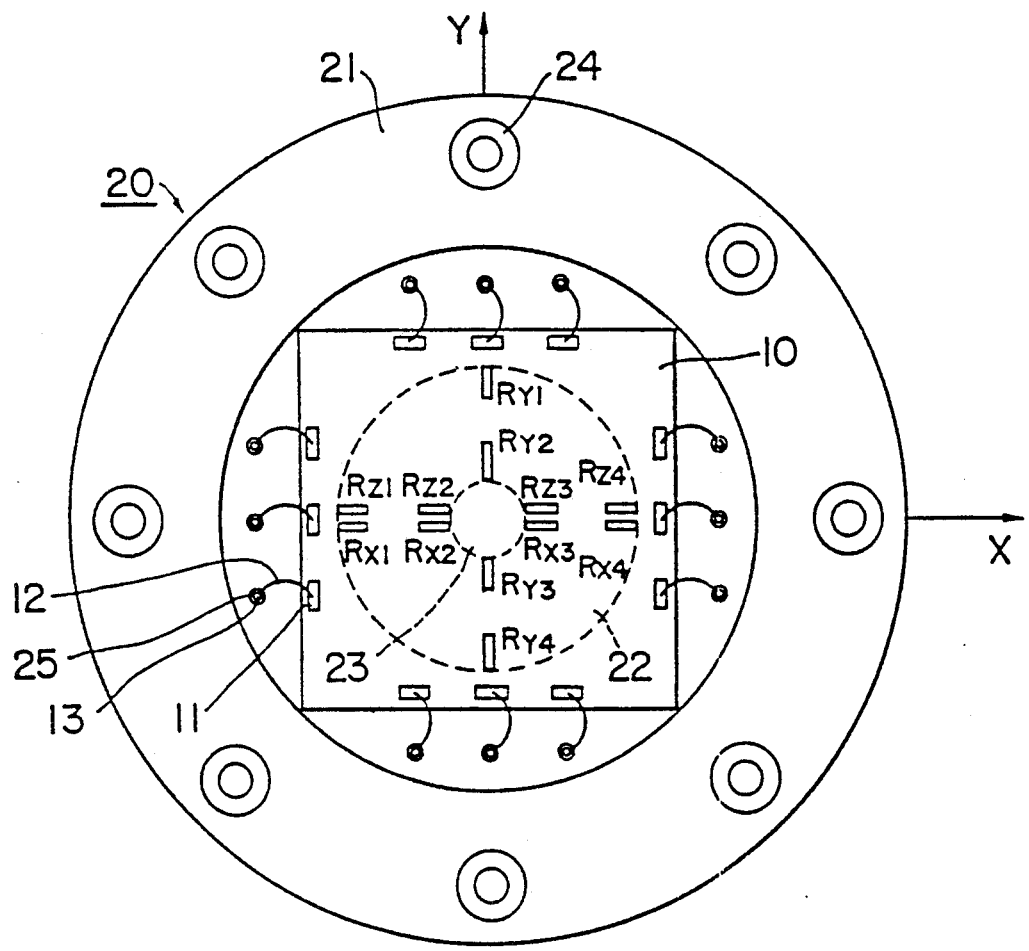
FIG. 1(b) is a top view thereof.

FIG. 1(a) is a side cross sectional view of this elementary sensor, and FIG. 1(b) is a top view thereof, wherein X-, Y- and Z-axes are defined in directions shown, respectively. FIG. 1(a) corresponds to a cross sectional view cut along the X-axis of the sensor shown in FIG. 1(b).

In this sensor, 12 resistance elements R in total are formed on a single crystal substrate 10 of silicon. Resistance elements Rx1 to Rx4 are arranged on the X-axis and are used for detecting a force in X-axis direction, resistance elements Ry1 to Ry4 are arranged on the Y-axis and are used for detecting the force in Y-axis, and resistance elements Rz1 to Rz4 are arranged on an axis parallel to the X-axis and positioned in the vicinity thereof and are arranged for detecting a force in Z-axis direction. The actual structure of respective resistance elements R and the method of manufacturing them will be described in detail later. These resistance elements have the piezo resistance effect that the electric resistance varies depending upon a mechanical deformation.

The single crystal substrate 10 is bonded to a strain generative body 20. In the example shown in FIG. 1, the strain generative body 20 is comprised of a supporting portion 21 at the peripheral portion thereof, a flexible portion 22 of which thickness is formed thin so as to have flexibility, and a working portion 23 protruded in the center thereof. For the material of the stain generative body 20, kovar (alloy of iron (Fe), cobalt (Co) and nickel (Ni)) is used. Since kovar has substantially the same order of a coefficient of thermal expansion as that of the silicon single crystal substrate 10, it is advantageous in that thermal stress produced by a temperature change is extremely small even in the case where the strain generative body is bonded to the single crystal substrate 10. The material and the configuration or shape of the strain generative body are not limited to the above and it is therefore should be appreciated that the embodiment shown here is only a most suitable one. Additionally, fitting holes 24 are provided in the strain generative body 20. Thus, the strain generative body 20 is screw-connected through fitting holes 24.

Figure 2A:
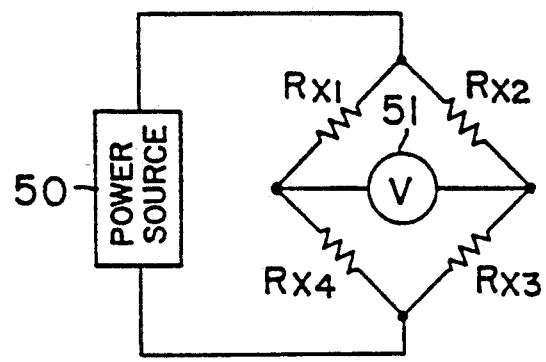
FIGS. 2(a), (b) and (c) are circuit diagrams showing a bridge circuit of resistance elements in the elementary sensor shown in FIG. 1, respectively.
Figure 2B:
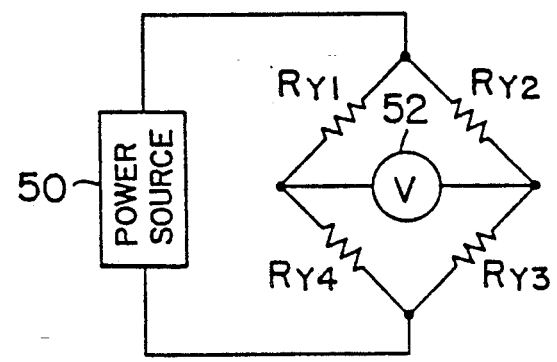
Figure 2C:
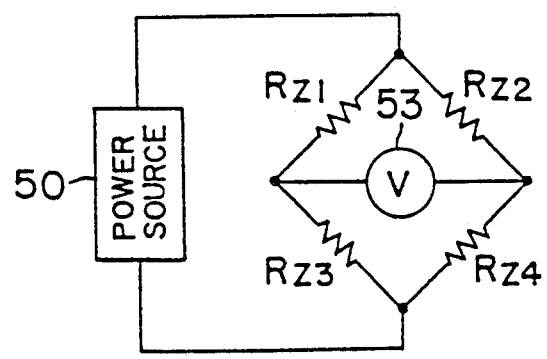

Wiring as shown in FIG. 2 is implemented to respective resistance elements. Namely, resistance elements Rx1 to Rx4 are constructed as a bridge circuit as shown in FIG. 2(a), resistance elements Ry1 to Ry4 are constructed as a bridge circuit as shown in FIG. 2(b), and resistance elements Rz1 to Rz4 are constructed as a bridge circuit as shown in FIG. 2(c). A predetermined voltage or current is delivered from the power supply 50 to the each bridge circuit and respective bridge voltages are measured by voltage meters 51 to 53. To implement such a wiring to the respective resistance elements R, bonding pads 11 and electrodes 13 for an external wiring electrically connected to the respective resistance elements R on the single crystal substrate 10 are connected by means of bonding wires 12 as shown in FIG. 1. These electrodes 13 are taken out to the external through wiring holes 25.

0.2 Principle of the elementary sensor

When a force is applied to the working point S at the front end of the working portion 23, a stress-strain corresponding to a force applied to the strain generative body 20 will be produced. Since the flexible portion 22 is of thin thickness and has flexibility, a displacement is produced between the working portion 23 and the supporting portion 21 so that respective resistance elements R are mechanically deformed. The electric resistance of each resistance element R changes by this deformation. Eventually, an applied force is detected as changes in respective bridge voltages shown in FIG. 2.

Figure 3A:
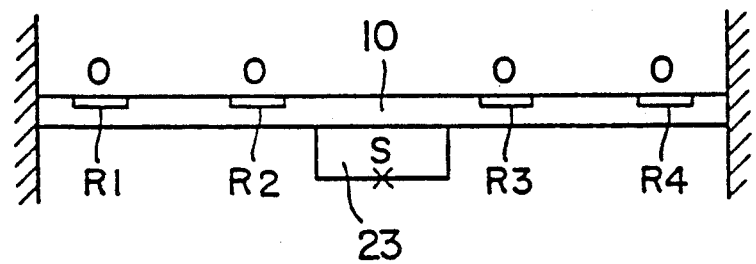
FIGS. 3(a), (b) and (c) are diagrams showing the relationship between mechanical deformation of single crystal substrate and resistance change of resistance element in the elementary sensor shown in FIG. 1, respectively.
Figure 3B:
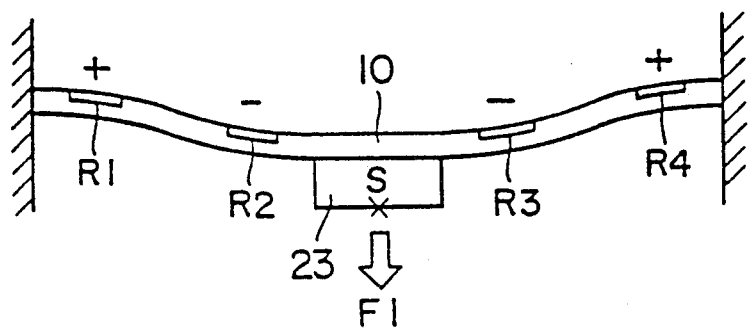
Figure 3C:
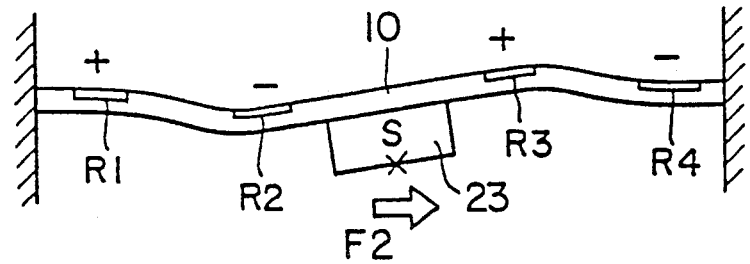

FIG. 3 shows the relationship between the stress-strain and the change in the electric resistance of the resistance element R. In this figure, only the single crystal substrate 10 and the working portion 23 of the strain generative body 20 are illustrated for brevity of explanation and an arrangement where resistance elements R1 to R4 are formed from the left to the right in the figure is taken as an example. First, when no force is applied to the working point S as shown in FIG. 3(a), no stress-strain is applied to the single crystal substrate 10, with the result that the resistance changes in all the resistance elements are equal to zero. On the other hand, when a force F1 in the lower direction is applied, the single crystal substrate 10 is mechanically deformed as shown in the figure. When it is now assumed that the conductivity type of the resistance element is P-type, such a deformation allows the resistance elements R1 and R4 to be expanded, resulting in an increased resistance (indicated by the plus sign), and allows the resistance elements R2 and R3 to be contracted, resulting in a decreased resistance (indicated by the minus sign). Moreover, when a force F2 in the right direction is applied, the single crystal substrate 10 is mechanically deformed as shown in the figure (Actually, the force F2 is exerted on the single crystal substrate 10 as the moment force). Such a deformation allows the resistance elements R1 and R3 to be expanded, resulting in an increased resistance, and allows the resistance elements R2 and R4 to be contracted, resulting in a decreased resistance. It is to be noted that since respective resistance elements R are resistance elements having the lateral direction in the figure as the length direction, where a force is applied in a direction perpendicular to the plane of the paper in the figure, changes in the resistance values of the respective resistance elements are negligible. As just described above, this sensor independently senses forces in respective directions by making use of the fact that the resistance changed characteristic of the resistance element varies in dependence upon the direction of an applied force.

0.3 Operation of the elementary sensor

The operation of the above-described elementary sensor will be described with reference to FIGS. 4 to 6.

Figure 4A:
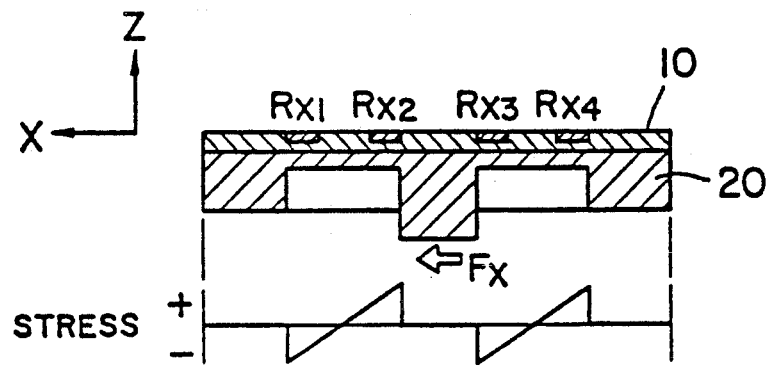
FIGS. 4(a), (b) and (c) are diagrams showing the stress distribution when force Fx is exerted on the elementary sensor shown in FIG. 1, respectively.
Figure 4B:
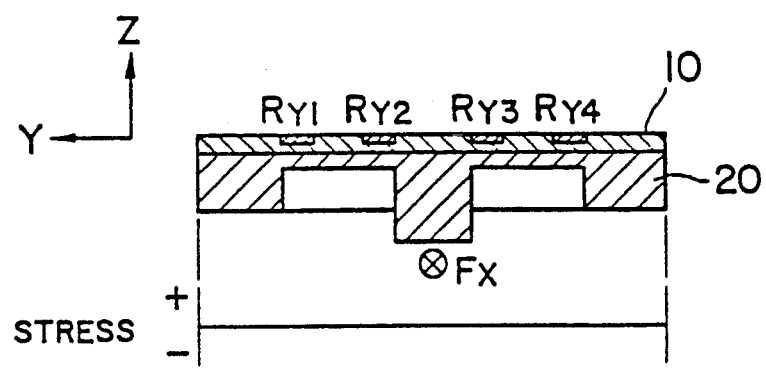
Figure 4C:
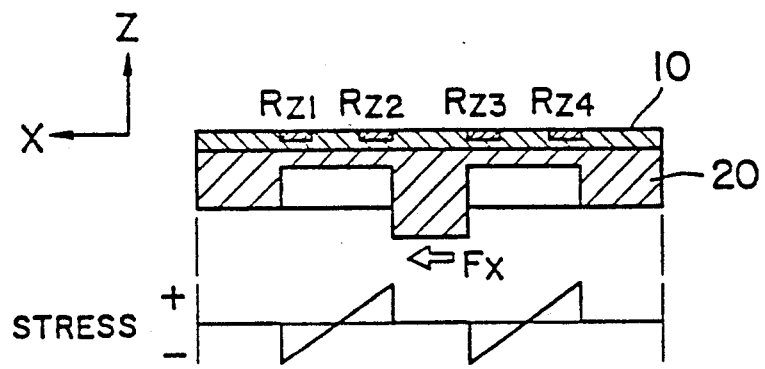
Figure 6A:
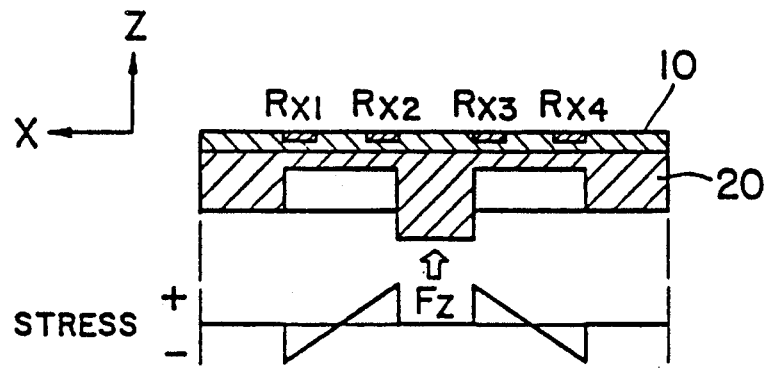
FIGS. 6(a), (b) and (c) are diagrams showing the stress distribution when force Fz is exerted on the elementary sensor shown in FIG. 1, respectively.
Figure 6B:
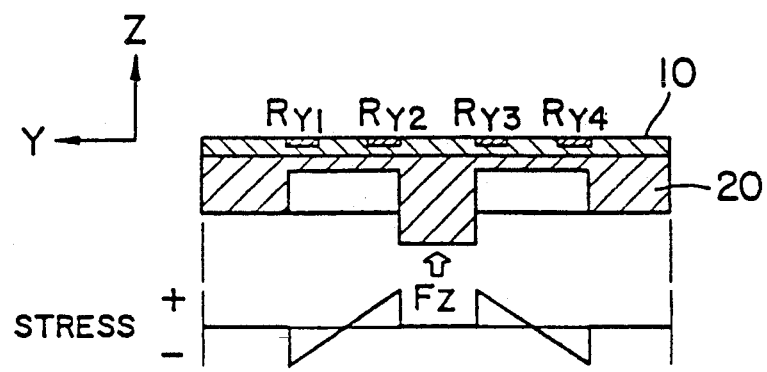
Figure 6C:
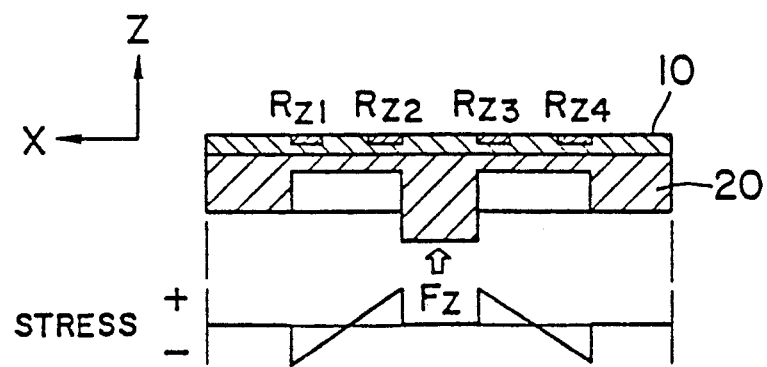

FIG. 4 shows stresses applied to respective resistance elements (expansion and contraction directions are indicated by plus (+) and minus (−), respectively, and no change is indicated by 0) when a force is applied in the X-axis direction, FIG. 5 shows stresses applied thereto when a force is applied in the Y-axis direction, and FIG. 6 shows stresses applied thereto when a force is applied in the Z-axis direction. In each figure, (a), (b) and (c) show the cross section cut along the X-axis of the sensor, the cross section cut along the Y-axis thereof, and the cross section parallel to the X-axis and cut along the elements Rz1 to Rz4 thereof, respectively.

First, when consideration is made in connection with the case where a force in the X-axis direction as indicated by an arrow Fx (the direction perpendicular to the plane of the paper in FIG. 4(b)) in FIGS. 4(a), (b) and (c) is applied, stresses having polarities respectively shown are produced. The polarities of these stresses will be readily understood from the explanation of FIG. 3. In respective resistance elements R, resistance changes corresponding to such stresses are produced. For example, the resistance of the resistance element Rx1 is decreased (−), the resistance of the resistance element Rx2 is increased (+), and the resistance of the resistance element Ry1 does not change (0). Further, where forces are applied in the Y- and Z-axis directions as indicated by arrows Fy and Fz of FIGS. 5 and 6, respectively, stresses as shown are produced.

Eventually, the relationship between applied forces and changes in respective resistance elements tabulates as shown in Table 1.

TABLE 1

|  | Fx | Fy | Fz |
| --- | --- | --- | --- |
| Rx1 | − | 0 | − |
| Rx2 | + | 0 | + |
| Rx3 | − | 0 | + |
| Rx4 | + | 0 | − |
| Ry1 | 0 | − | − |
| Ry2 | 0 | + | + |
| Ry3 | 0 | − | + |
| Ry4 | 0 | + | − |
| Rz1 | − | 0 | − |
| Rz2 | + | 0 | + |
| Rz3 | − | 0 | + |
| Rz4 | + | 0 | − |

When the fact that respective resistance elements R constitute bridge circuits as shown in FIG. 2 is taken into consideration, the relationship between applied forces and changes of respective voltage meters 51 to 53 is as shown in Table 2.

TABLE 2

|  | Fx | Fy | Fz |
| --- | --- | --- | --- |
| VOLTAGE METER 51 | CHANGE | NO | NO |
| VOLTAGE METER 52 | NO | CHANGE | NO |
| VOLTAGE METER 53 | NO | NO | CHANGE |

The resistance elements Rz1 to Rz4 are subjected to substantially the same stress changes as those of the resistance elements Rx1 to Rx4. However, it is to be noted that because the both resistance elements have bridge configuration different from each other, voltage meters 51 and 53 provide different responses. Eventually, the voltage meters 51, 52 and 53 will respond to forces in X-, Y- and Z-axis directions, respectively. It is further to be noted that although only the presence of changes is indicated in Table 2, the polarity of changes is ruled by an applied force and a quantity of changes is ruled by the magnitude of an applied force.

0.4 Structure of the elementary sensor capable of detecting six-axis component While the discrimination between the force and the moment with respect to respective axes is not clearly made in the above-described elementary sensor, an elementary sensor described below can independently detect forces exerted in respective axis directions and moment exerted about respective axes, respectively. This sensor will be referred to as a "six-axis component sensor" hereinafter.

Figure 7:
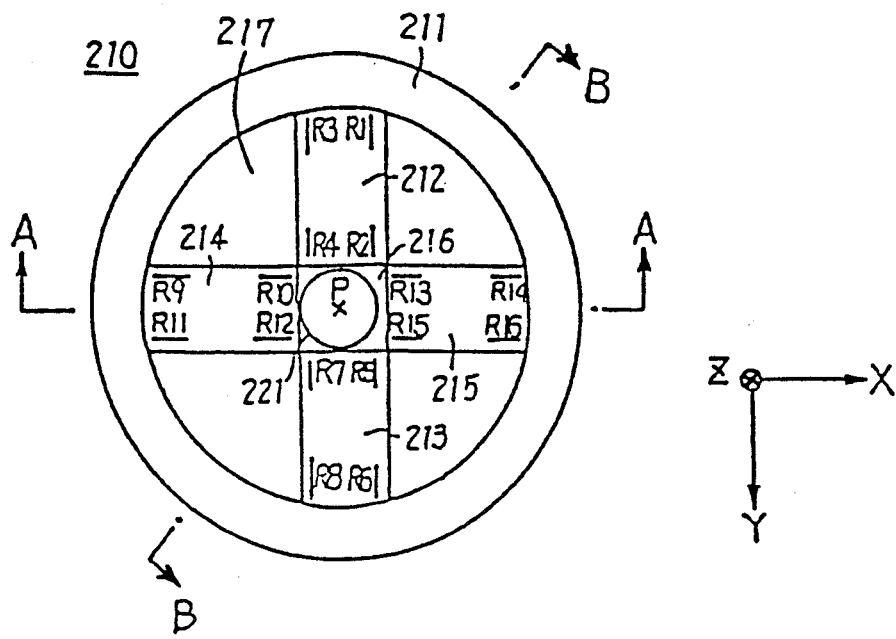
FIG. 7 is a top view of another elementary sensor (six-axis component sensor) capable of detecting six-axis components according to this invention.
Figure 8:
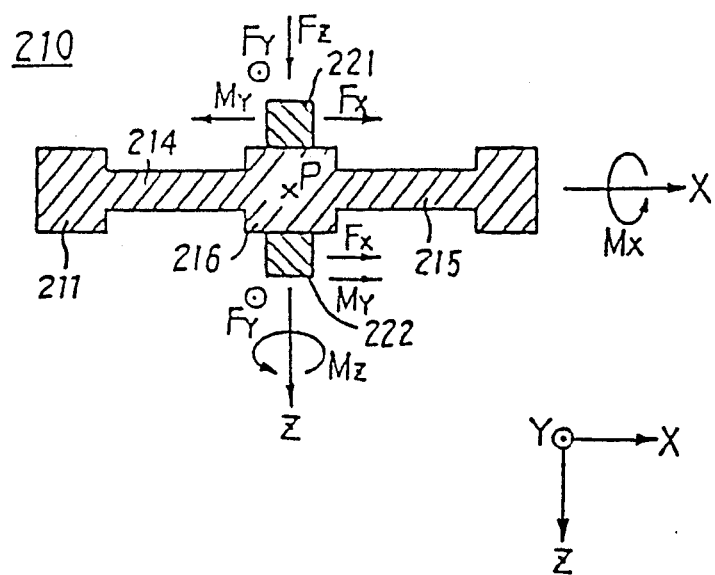
FIG. 8 is a cross sectional view thereof.

FIG. 7 is a top view of the six-axis component sensor, and FIG. 8 is a cross sectional view cut along the cutting line A—A of the sensor shown in FIG. 7. In this embodiment, 16 sets of resistance element groups R1 to R16 are formed on the surface of a strain generative body 210. The strain generative body 210 is comprised of a silicon single crystal substrate. The resistance element groups R1 to R16 are sets of a plurality of resistance elements, respectively, and are formed by diffusing an impurity onto the single crystal substrate. The resistance elements thus formed exhibit a piezo resistance effect and have the property that the electric resistance changes in dependence upon a mechanical deformation.

The strain generative body 210 is composed of a fixed portion 211 formed annular at the periphery thereof, four bridge portions 212 to 215, and a working portion 216 to which these four bridge portions 212 to 215 are commonly joined. The fixed portion 211 is fixed to the external and a force or a moment to be detected is applied to the working point P in the center of the working portion 216. Since the fixed portion is fixed to the external, when a force or moment is applied to the working point P, strains due to stresses corresponding the force or moment are produced in the bridge portions 212 to 215. Thus, changes of the electric resistance of the resistance element groups R1 to R16 are produced. This detector serve to detect the force and the moment on the basis of the changes of the electric resistance. In this embodiment, resistance elements are the same in their size, shape and material and all have the same resistance value. In addition, the resistance change rates based on stress-strain are all equal to each other.

As shown in FIGS. 7 and 8, it is now assumed that the working point P in the center of the working portion 216 is taken as the origin of the X, Y, Z three-dimensional coordinate system and three axes of X, Y and Z are defined as shown. Namely, it is assumed that the right direction of the drawing illustrated as FIG. 7, the downward direction thereof, and the direction perpendicular to the plane of paper and directed downwardly are defined as the positive direction of the X-axis, the positive direction of the Y-axis, and the positive direction of the Z-axis, respectively. At the upper and lower portions of the working portion 216, working bodies 221 and 222 are affixed, respectively. Forces and moments exerted on the working point P will be all applied to the working bodies 221 and 222. Assuming now that, with respect to the working point P, forces applied in the X-, Y- and Z-direction are designated by FX, FY and FZ, respectively, and moments applied about the X-, Y- and Z-axes are designated by MX, MY and MZ, respectively, forces and moments are defined in directions indicated by respective arrows in FIG. 8. Namely, the force FX applied in the X-axis direction serves as a force to move both the working bodies 221 and 222 in a right direction in the figure. The force FY applied in the Y-axis direction serves as a force to move both the working bodies 221 and 222 in a direction perpendicular to the plane of paper in the figure and taken upward. The force FZ applied in the Z-axis serves as a force to move downward both the working bodies 221 and 222 in a downward direction in the figure. Further, the moment MX about the X-axis serves as a moment to move the working body 221 in a direction perpendicular to the plane of paper and taken upward and the working body 222 in a direction perpendicular to the plane of paper and taken downward. The moment MY about &he Y-axis serves as a moment to move the working body 221 in a left direction in the figure and the working body 222 in a right direction in the figure. The moment MZ about the Z-axis serves as a moment to move both the working bodies 221 and 222 clockwise when viewed from the upward direction of the detector.

Such 16 sets of resistance element groups R1 to R16 are arranged at positions symmetrical with each other as shown in FIG. 7. Namely, resistance element groups R1 to R4 are provided on the bridge portion 212, resistance element groups R5 to R8 on the bridge portion 213, resistance element groups R9 to R12 on the bridge portion 214, and resistance element groups R13 to R16 on the bridge portion 215. When an attention is drawn to each bridge portion, a pair of resistance element groups and another pair thereof are provided in the vicinity of the fixed portion 211 and in the vicinity of the working portion 216, respectively, and such pairs of resistance element groups are provided on the both sides of the X-axis or the Y-axis, respectively.

By using such 16 sets of resistance element groups, six kinds of bridges as shown in FIGS. 9(a) to (f) are formed. To these bridges, power supplies 230 are connected, and voltage meters 241 to 246 adapted to output voltages VFX, VFY, VFZ, VMX, VMY, VMZ proportional to the porces FX, FY and FZ, and the moments MX, MY and MZ as their bridge voltages are connected, respectively.

It is to be noted that the symbol of each resistance element shown in the bridge circuit diagram means one resistance element of the resistance element group, and even resistance elements labeled by the same symbol mean other resistance elements which belong to the same resistance element group. For example, the resistance element R1 is used in the two bridges of FIGS. 9(b) and (d). However, two resistance elements are arranged at the position of R1 of FIG. 7 in practice, and different resistance elements are used in the different bridges.

It is assumed that the same symbol Rx is used also for an indication of one resistance element belonging to the resistance element group Rx (x=1 to 16) for the brevity of explanation.

0.5 Operation of the six-axis component sensor

The operation of the above-described detector will be described. In the case of the arrangement of resistance elements as shown in FIG. 7, when the force FX, FY or FZ, or the moment MX, MY or MZ is applied to the working point P, respective resistance elements produce electric resistance changes as in the Table shown in FIG. 10 (Each resistance element is assumed to be composed of P-type semiconductor) wherein "0" represents no change, and "+" and "−" represent an increase and a decrease in the electric resistance, respectively.

Figures 11A, 11C:
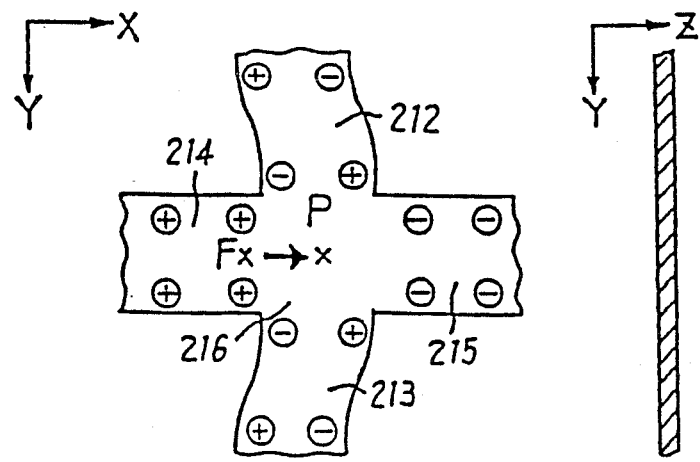
FIGS. 11(a), (b) and (c) are diagrams showing the mechanical deformation and the resistance value change when force Fx is applied to the six-component sensor shown in FIG. 7, respectively.
Figure 11B:
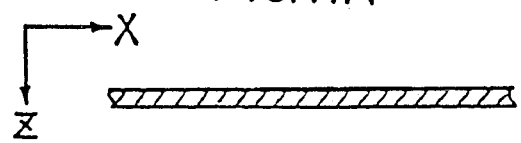
Figures 12A, 12C:
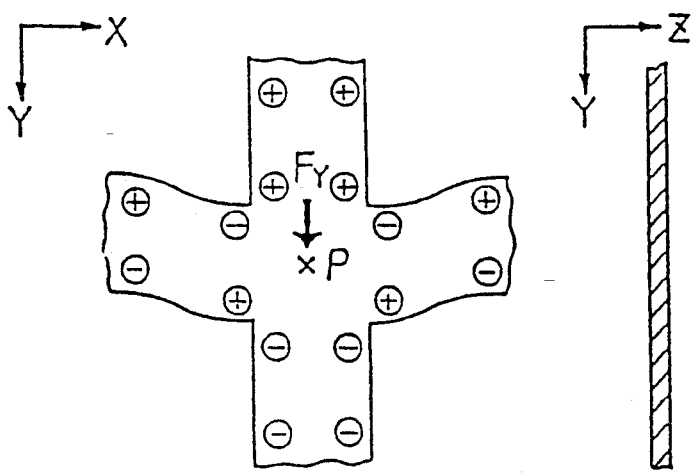
FIGS. 12(a), (b) and (c) are diagrams showing the mechanical deformation and the resistance value change when force Fy is applied to the six-component sensor shown in FIG. 7, respectively.
Figure 12B:
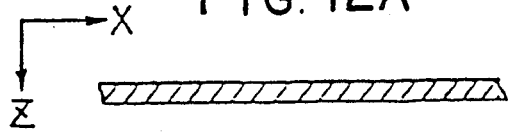

The reason why the results as shown in FIG. 10 will be now briefly described with reference to FIGS. 11 to 16. FIGS. 11 to 16 are diagrams showing changes in the stress-strain and the electric resistance produced in the bridge portion when the forces FX, FY or FZ, or the moment MX, MY or MZ is applied to the working point P, wherein (a) in each figures is a top view of the bridge portion, (b) in each figure is a front and cross sectional view, and (c) in each figure is a side cross sectional view. For example, the state where the force FX in the X-axis direction is exerted on the working point P is shown in FIG. 11. By the force FX, the bridge portion 214 is expanded and the bridge portion 215 is contracted. Accordingly, the resistance elements (R9 to R12) in the bridge portion 214 expand, resulting in an increase in the electric resistance (in the case of P-type semiconductor), and the resistance elements (R13 to R16) in the bridge portion 215 contracts, resulting in a decrease in the electric resistance. The resistance elements in the bridge portions 212 and 213 expands or contracts depending upon the arrangement positon. Eventually, it is readily understood that the results as shown in the first column of the Table shown in FIG. 10 are obtained. It is also understood by making reference to FIGS. 12 to 16 that the results in the second to sixth columns of the Table shown in FIG. 10 are obtained.

When the fact that the bridges as shown in FIG. 9 are constructed by respective resistance elements R1 to R16 is taken into consideration, the relationship between FX, FY, FZ, MZ, MY and MZ applied to the working point P and detection voltages VFX, VFY, VFZ, VMX, VMY, and VMZ appearing on the voltage meters 241 to 246 is indicated by the Table shown in FIG. 17, wherein "0" indicates that a voltage change does not appear and "V" indicates that a voltage change appears depending upon an applied force or moment. The polarity of the voltage change will be dependent upon the direction of an applied force or moment, and the magnitude of the voltage change will be dependent upon the magnitude of an applied force or moment.

Figures 9A, 9B:
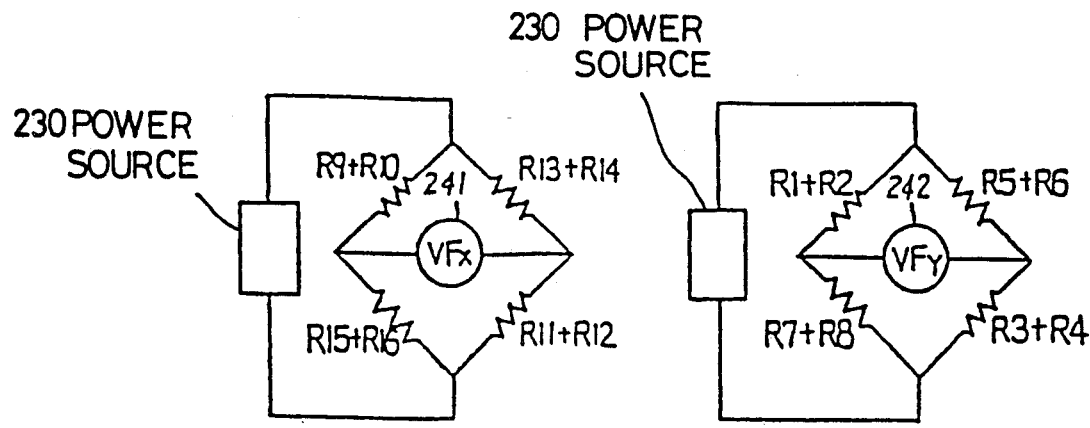
FIGS. 9(a) to (f) are circuit diagrams showing a bridge circuit of resistance elements in the six-component sensor shown in FIG. 7, respectively.
Figures 9C, 9D:
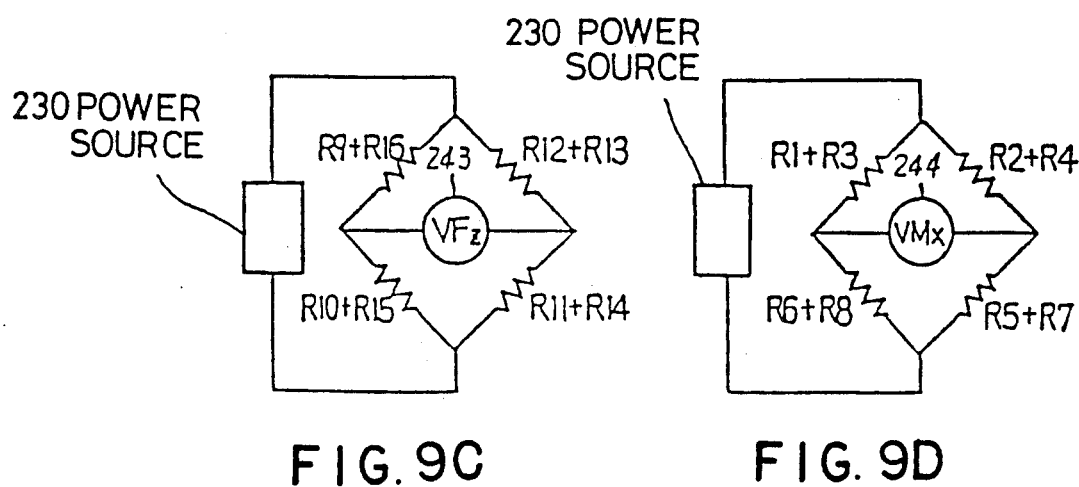
Figures 9E, 9F:
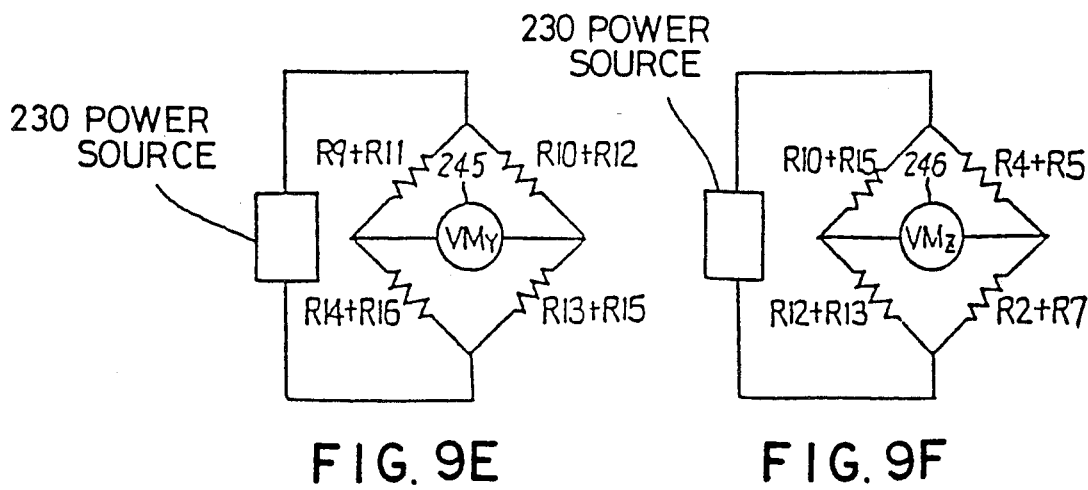

When the fact that there is no voltage change in the case where the products of resistance values of resistance elements positioned on the opposite sides of the bridge ar equal to each other is taken into consideration it is readily understood that the Table as shown in FIG. 17 is obtained. For example, in the case where the force FX is applied, respective resistance elements produce changes in the electric resistance as indicated by the first column of the Table shown in FIG. 10. Referring now to FIG. 9(a), the resistance values of the resistance elements R9, R10, R11 and R12 all increase, and the resistance values of the resistance elements R13, R14, R15 and R16 all decrease. Accordingly, there occurs a large difference between the products of resistance values of resistance elements positioned on the opposite sides. Thus, a voltage change "V" is detected. On the other hand, there is no change in the bridge voltage in the bridge circuits shown in FIGS. 9(b) to (f). For example, in the circuit of FIG. 9(b), if the resistance element R1 indicates "−", the resistance element R2 indicates "+", so that resistance changes are canceled every respective branches. Thus, the effect of the force FX is exerted only on the detection voltage VFX. Thus, the force FX can be independently detected by the measurement of the detection voltage VFX.

The fact that only the diagonal component is "V" and other components are all "0" in the Table of FIG. 17 indicates that respective detection values can be obtained directly as a reading value of the voltage meter.

By constructing such a bridge as described above, the effect or influence of resistance changes based on the factor except for the stress can be canceled. For example, the electric resistance of each resistance element varies depending upon temperature. However, since all the resistance elements constituting the bridge vary substantially identically, the effect or influence of such temperature changes can be canceled. Accordingly, this bridge construction enables realization of higher precision measurement.

0.6 Manufacture of resistance element having piezo resistance effect

Figure 18A:
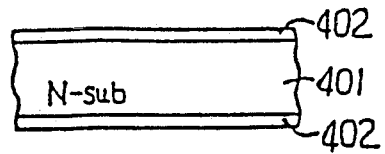
FIG. 18 is a diagram showing an example of a method of manufacturing a semiconductor substrate constituting the elementary sensor shown in FIG. 1.
Figure 18B:
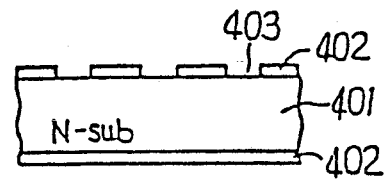
Figure 18C:
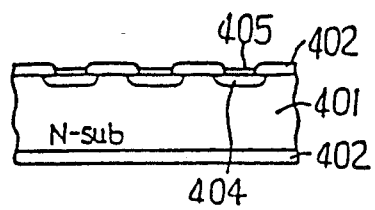
Figure 18D:
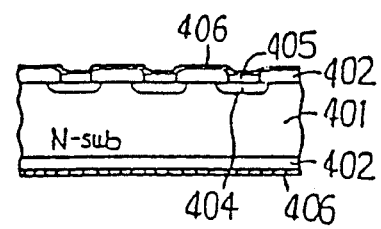
Figure 18E:
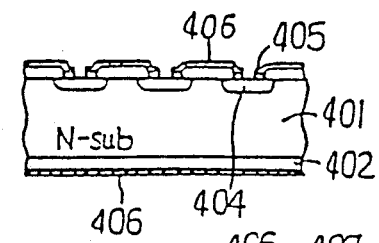
Figure 18F:
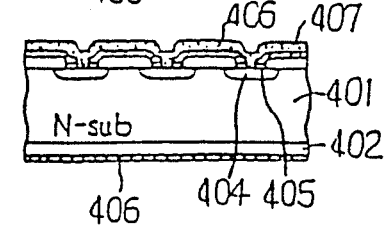
Figure 18G:
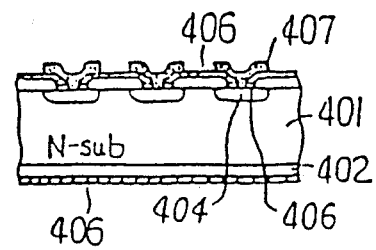

An example of a method of manufacturing resistance elements used in the above-described sensor will be now described. This resistance element has a piezo resistance effect and is formed by the semiconductor planar process on a semiconductor substrate. First, as shown in FIG. 18(a), an N-type silicon substrate is thermally oxidized to form a silicon oxide layer 402 on the surface thereof. Then, as shown in FIG. 18(b), the silicon oxide layer 402 is subjected to etching by the photolithographic process to form an opening 403. Subsequently, as shown in FIG. 18(c), boron (B) is thermally diffused from the opening 403 to form a P-type diffused region 404. It is to be noted that a silicon oxide layer 405 is formed in the opening 403 at the process of the thermal diffusion. Then, as shown in FIG. 18(d), silicon nitride is deposited by the CVD method to form a silicon nitride layer 406 as a protective layer. After contact holes are opened in the silicon nitride layer 406 and the silicon oxide layer 405 by the photolithographic method as shown in FIG. 18(e), an aluminum wiring layer 407 is formed by vacuum deposition as shown in FIG. 18(f). Finally, patterning is implemented to the aluminum wiring layer 407 by the photolithographic method to provide a structure as shown in FIG. 18(g).

It is to be noted that the above-described manufacturing process is shown as an example, and a sensor used for this invention may be therefore realized by using any resistance elements which essentially have the piezo resistance effect.

§1 Force detector

An explanation will be now made on the basis of an embodiment of a force detector utilizing the above-described elementary sensor.

1.1 Construction of the detector

Figure 19A:
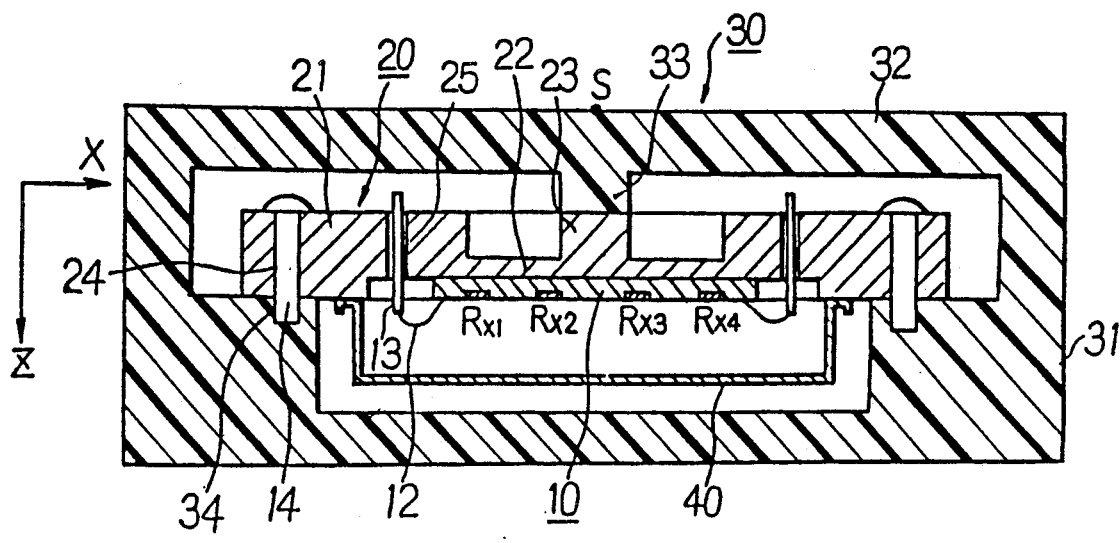
FIG. 19(a) is a cross sectional view of a force detector according to this invention.
Figure 19B:
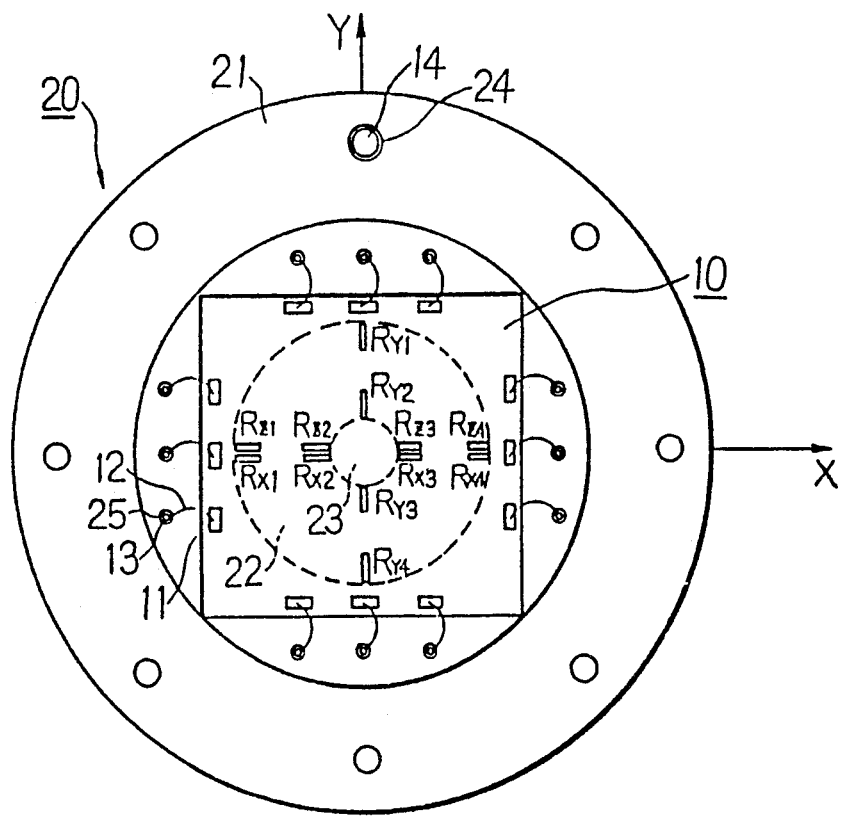
FIG. 19(b) is a top view of an elementary sensor used in this force dector.

FIG. 19(a) is a side cross sectional view of a force detector according to an embodiment of this invention, and FIG. 19(b) is a partial bottom view of the detector shown in FIG. 19(a), wherein X-, Y- and Z-axes are defined in directions shown, respectively. FIG. 19(a) corresponds to a cross sectional view cut along the X-axis of the detector shown in FIG. 19(b).

This detector is roughly composed of three portions of semiconductor substrate 10, first strain generative body 20 (indicated by single hatched lines), and second strain generative body 30 (indicated by double hatched lines). FIG. 19(b) shows only the semiconductor substrate 10 and the first strain generative body 20 of the entire components. This corresponds to the above-described elementary sensor.

The first strain generative body 20 is fixed toward fitting holes 34 provided in the second strain generative body 30 by means of fixing screws 14 penetrated through fitting holes 24.

On the lower portion of the first strain generative body 20, a protective cover 40 for protecting the single crystal substrate 10 is mounted (its indication is omitted in FIG. 19(b)). For the protective cover 40, any cover having a protective function may be used, and the provision of such a cover may be omitted depending upon the manner how this detector is used.

Respective resistance elements are assembled into bridge circuits as described before. To respective bridge circuits, predetermined voltages or currents are delivered from power supply 50. The bridge voltages thus delivered are measured by voltage meters 51 to 53, respectively. For implementing such a wiring to respective resistance elements R, bonding pads 11 electrically connected to respective resistance elements R on the single crystal substrate 10 and electrodes 13 for external wiring are connected by means of bonding wires 12. The electrodes 13 are guided to the opposite side of the first strain generative body 20 through wiring holes 25. After that, wiring will be implemented to these electrode 13 from the external of the second generative body. In FIG. 19, such a wiring is omitted.

It is to be noted that strain generative body 20 and single crystal are constituted separately from each other in the above-described embodiment, but when strain generative body is constituted by single crystal, the both members may be integrally formed.

As seen from the cross section of FIG. 19(a), the second strain generative body 30 is hollow cylindrical, and is composed of an outside fixing portion 31, a flexible portion 32 for rendering flexibility, and a displacement portion 33 projected inwardly in the center thereof. In this example, the front end of the displacement portion 33 is formed flat, and is bonded by brazing to the front end of the working portion 23 of the first strain generative body 20 similarly formed flat. Instead of the brazing, any means essentially permitting the working portion 23 and the displacement portion 33 to be connected, e.g., screw fitting, et. may be used.

After the first and second strain generative bodies 20 and 30 are separately molded, respectively, they will be connected to each other. When an attention is drawn to the connecting relationship, the supporting portion 21 of the first strain generative body 20 is connected to the fixing portion 31 of the second strain generative body 30, and the working portion 23 of the first strain generative body 20 is connected to the displacement portion 33 of the second strain generative body 30. In addition, since the working portion 23 is connected to the supporting portion 21 through the flexible portion 22 in regard to the first strain generative body 20, the working portion 23 can produce a displacement relative to the supporting portion 21 by deflection of the flexible portion 22. Further, since the displacement portion 33 is connected to the fixing portion 31 through the flexible portion 32, the displacement portion 33 can produce a displacement relative to the fixing portion 31 by deflection of the flexible portion 32.

1.2 Fundamental principle of the detector

In FIG. 19(a), when a force is applied to the displacement point S above the displacement portion 33, a strain-stress corresponding to the applied force will be produced in the second strain generative body 30. As described above, the flexible portion 32 is bent, so that a displacement is produced between the displacement portion 33 and the fixing portion 31. The displacement is transmitted to the working portion 23 of the strain generative body 20. Thus, the flexible portion 22 is bent, so that a displacement is produced between the working portion 23 and the supporting portion 21. As a result, respective resistance elements R will be mechanically deformed. As described above, the electric resistance values of respective resistance elements R vary. Eventually, the applied force is detected by changes of respective bridge voltages.

1.3 Application to a wide variety of measurement ranges

As described above, by allowing the first and second strain generative bodies 20 and 30 to carry out the strain generative operation to the semiconductor substrate 10, application to a wide variety of measurement ranges which is the first object of this invention becomes possible. Namely, one kind of parts corresponding to the portion of the elementary sensor shown in FIG. 19(b), i.e., the portion of the semiconductor substrate 10 and the first strain generative body 20 are first mass-produced in accordance with the unified standard.

Then, a large of kinds of second strain generative bodies 30 are prepared according to measurement ranges to connect them to the first strain generative body, thus to manufacture various products capable of coping with various measurement ranges. For example, in the case of manufacturing detectors for carrying out a relatively high precision measurement having a weight measurement range of 0 to 1 Kg, it is sufficient for this purpose to use a strain generative body 30 which has the same diameter as that of others, but has a flexible portion 32 thinner than others. Moreover, in the case of manufacturing detectors for carrying out a relatively large load measurement having a measurement range of 0 to 100 Kg, it is sufficient for this purpose to use a strain generative body 30 which has the same diameter as that of others, but has a flexible portion 32 thicker than others. In addition, the sensitivity may be changed by altering the diameter of the strain generative body 30.

For preparing the semiconductor substrate 10 to bond it to the first strain generative body thus to enable detection of force, it is required to undergo a large number of processes. On the contrary, the second strain generative body 30 can be relatively easily prepared by molding. Accordingly, as compared to the preparation, of many kinds of elementary sensors, the preparation of many kinds of second strain generative bodies is extremely easier and results in more improved cost performance.

1.4 Other embodiments

The force detector according to this invention has been explained on the basis of the embodiment shown. However, this invention is not limited to the above-described embodiment, but may be applied in various manners. For example, while the supporting portion of the first strain generative body and the fixed portion of the second strain generative body are completely fixed in the above-described embodiment, it is not necessarily required that both members are completely fixed, but they may be connected through slidable means. In short, it is sufficient that both members are only fixed with respect to the direction of a force to be detected. For example, while the first and second strain generative bodies 20 and 30 are fixed by means of the fitting screws 13 in FIG. 19(a), the first strain generative body 20 may be affixed to the second strain generative body 30 so that the former is slidable within a plane on which resistance elements are formed.

Moreover, while two strain generative bodies are used in the above-described embodiment, it is sufficient that this invention is provided with at least two strain generative bodies. An implementation provided with a plurality of strain generative bodies, e.g., three or four ones, etc. may be possible.

Further, while the central portion of the first strain generative body serves as the working portion and the peripheral portion thereof serves as the fixed portion, and the central portion of the second strain generative body serves as the displacement portion and the peripheral portion thereof serves as the fixed portion in the above-described embodiment, this invention is not limited to such a configuration. An implementation such that the central portion and the peripheral portion have an opposite relationship may be possible.

In addition, while the elementary sensor shown in FIG. 1 is used as the transducer in the above-described embodiment, the six-axis component sensor shown in FIG. 7 may be used. In short, any transducer having a function to convert a mechanical deformation to an electric signal may be used. For example, a sensor using a strain gauge may be applied.

1.5 Advantages with the embodiment

As described above, in accordance with this invention, there is provides a force detector comprising a transducer for transforming a mechanical deformation to an electric signal, a first strain generative body for allowing the transducer to carry out the strain generative operation, and a second strain generative body for allowing the first strain generative body to carry out the strain generative operation. Accordingly, by preparing plural kinds of second strain generative bodies, this force detector can be applied to a wide variety of measurement ranges. Thus, application to a wide variety of measurement ranges can be easily realized.

§2 Force/Moment detector

The elementary sensor has been already described in §0, and the embodiment& for applying it to a wide variety of measurement ranges as a force detector has been described in §1. An embodiment in which the same elementary sensor is applicable both to the force detector and to the moment detector will be now described.

2.1 Construction of the detector

Figure 20A:
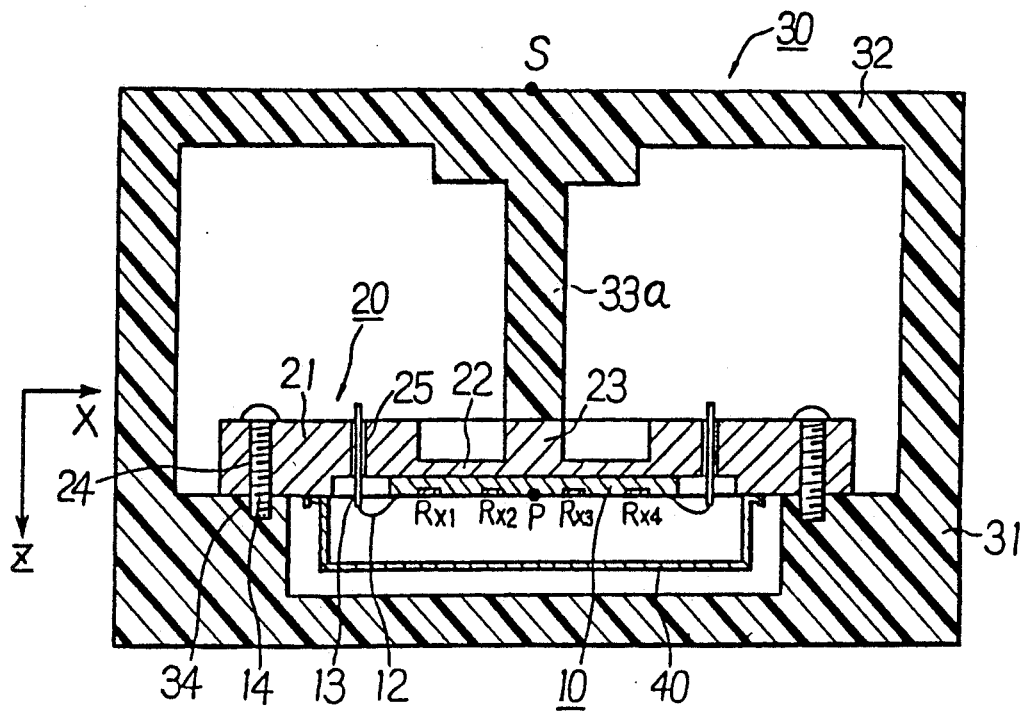
FIG. 20(a) is a cross sectional view of a force/moment detector according to this invention.
Figure 20B:
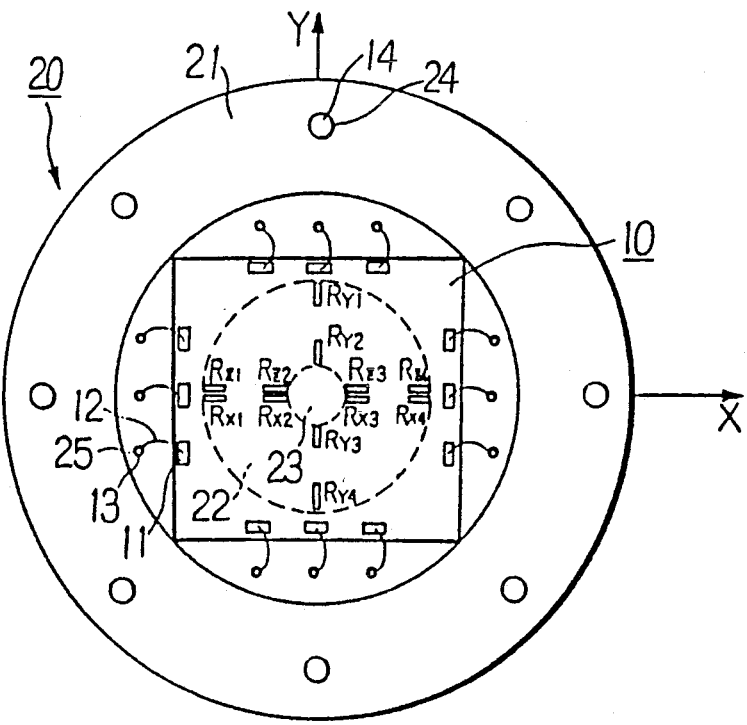
FIG. 20(b) is a top view of an elementary sensor used in this detector.

FIG. 20(a) is a side cross sectional view of a force detector according to an embodiment of this invention, and FIG. 20(b) is a partial bottom view of the detector shown in FIG. 20(a), wherein X-, Y- and Z-axes are defined in directions shown, respectively. FIG. 20(a) corresponds to a cross sectional view cut along the X-axis of the detector shown in FIG. 20(b).

This detector is roughly composed of three portions of semiconductor substrate 10, first strain generative body 20 (indicated by single hatched lines), and second strain generative body (indicated by double hatched lines). FIG. 20(b) shows only the semiconductor substrate 10 and the first strain generative body 20 of the entire components. This corresponds to the above-described elementary sensor.

When the above-described detector shown in FIG. 19 and the detector shown in FIG. 20 are compared with each other, it is seen that &hey are of very similar structure. The difference therebetween is that the displacement portion 33 in the former is replaced with the arm like portion 33a. The arm like portion is longer than the displacement portion 33, and is therefore suitable for transmission of moment. Since the both detectors are the same in structure in connection with other portions except for the above, detailed explanation of respective portions is omitted here.

2.2 Fundamental principle of the detector

When a force is applied to the working point S above the arm like portion 33a in FIG. 20(a), a stress-strain corresponding to the applied force will be produced in the second strain generative body 30. As previously described, the flexible portion 32 is bent, a displacement is produced between the arm like portion 33a and the fixed portion 31. This displacement is then transmitted to the working portion 23 of the first strain generative body 20. Thus, the flexible portion 22 is bent, so that a displacement is produced between the working portion 23 and the supporting portion 21. Then, a displacement is produced in the vicinity of the working point P on the semiconductor substrate 10. As a result, respective resistance elements R will be mechanically deformed. By this deformation, electric resistance values of respective resistance elements R change. Eventually, the applied force is detected as changes of respective bridge voltages.

2.3 Operation as a moment detector of the detector

Figure 22A:
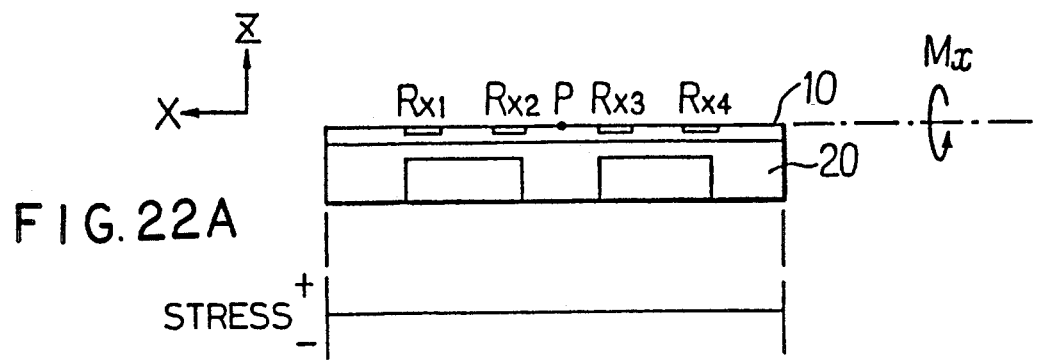
FIGS. 22(a), (b) and (c) are diagrams showing the stress distribution when moment Mx is exerted on the point P of the detector shown in FIG. 20, respectively.
Figure 22B:
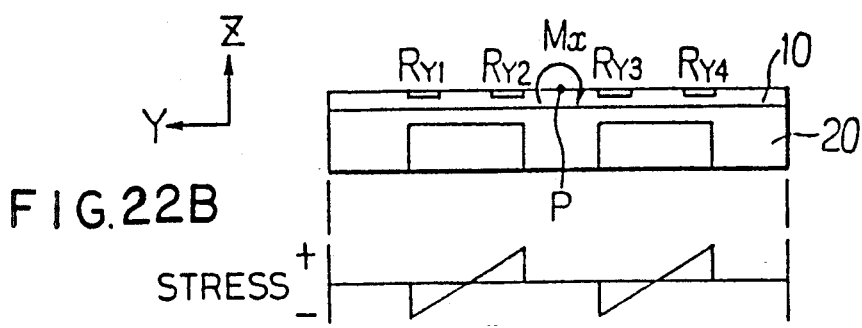
Figure 22C:
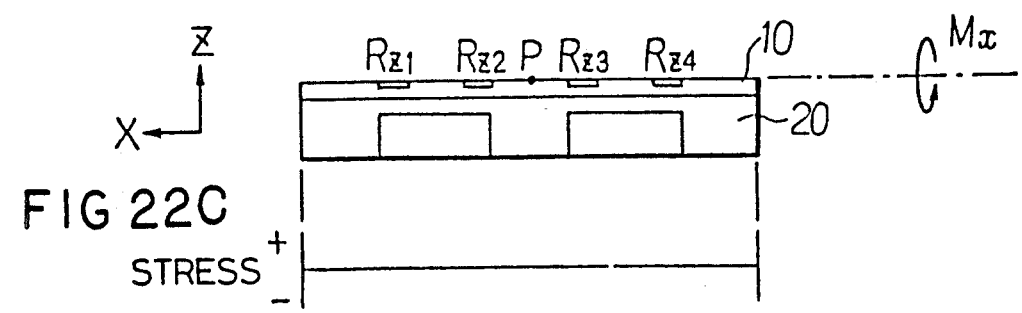
Figure 23A:
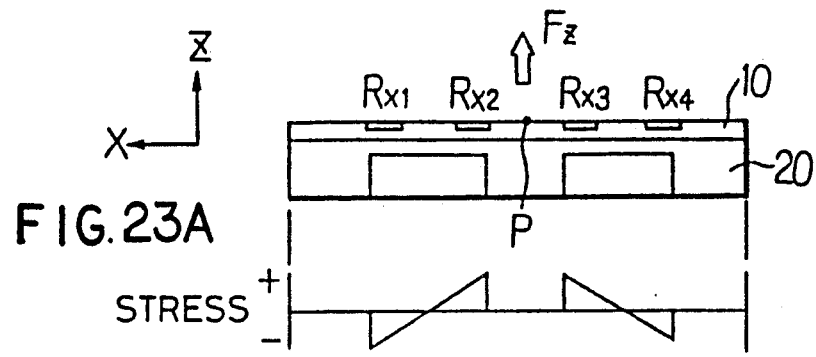
FIGS. 23(a), (b) and (c) are diagrams showing the stress distribution when force Fz is exerted on the point P of the detector shown in FIG. 20, respectively.
Figure 23B:
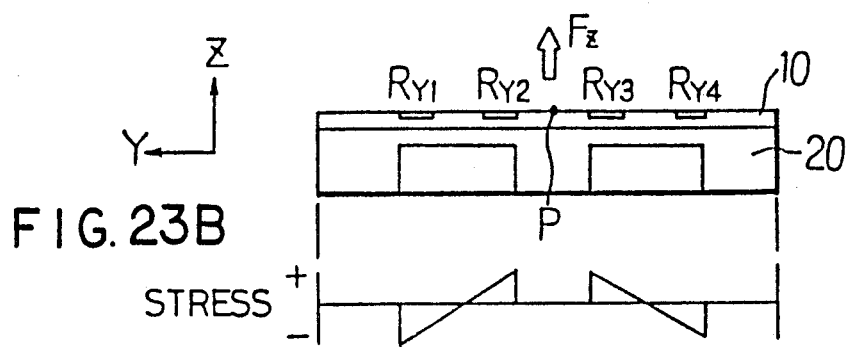
Figure 23C:
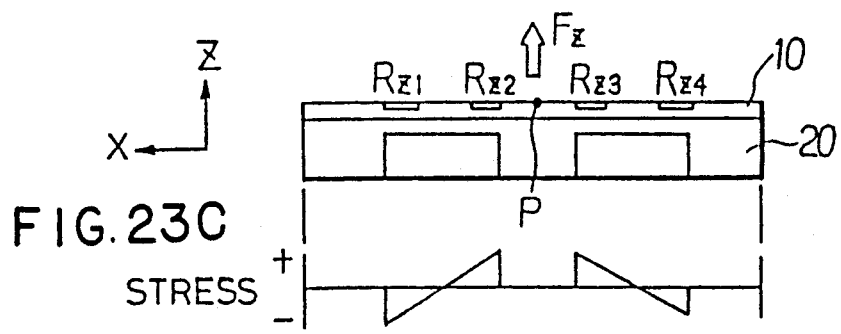

The operation of a detector comprising semiconductor substrate 10 and first strain generative body will be described with reference to FIGS. 21 to 23. Either view shows the semiconductor substrate 10 and the first strain generative body 20 with a relationship opposite to that in FIG. 20(a) in connection with upper and lower directions. FIG. 21 shows stresses applied to respective resistance elements (expanding and contracting directions are indicated by + (plus) and − (minus), respectively, and no change is indicated by "0" in the case where moment My about the Y-axis is applied to the working point P, FIG. 22 shows corresponding stresses in the case where moment Mx about the X-axis is applied to the working point P, and FIG. 23 shows corresponding stresses in the case where force Fz in the Z-axis direction is applied to the working point P. In each view, (a) represents the cross section cut along the X-axis of the detector shown in FIG. 20, (b) represents the cross section cut along the Y-axis thereof, and (c) represents the cross section cut in parallel with the X-axis and along the elements Rz1 to Rz4.

Figure 21A:
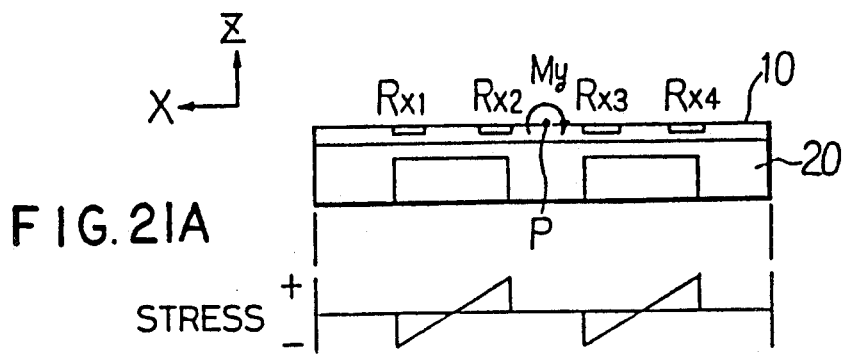
FIGS. 21(a), (b) and (c) are diagrams showing the stress distribution when moment My is exerted on the point P of the detector shown in FIG. 20, respectively.
Figure 21B:
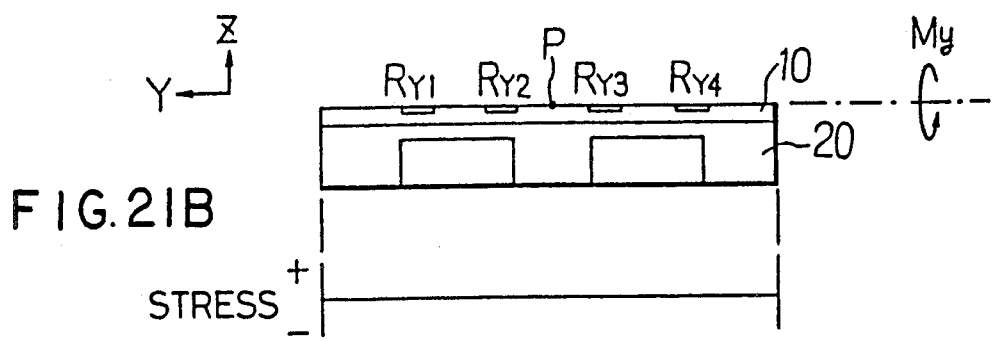
Figure 21C:
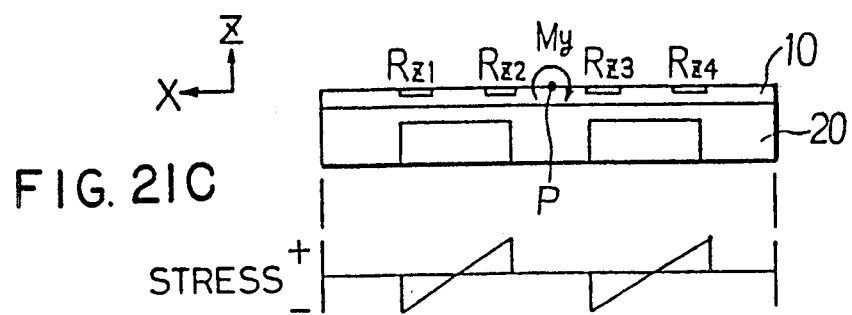

When it is assumed that moments about the Y-axis as indicated by an arrow My of FIGS. 21(a), (b) and (c) are applied, stresses having polarities as shown are produced, respectively. The polarities of these stresses will be readily comprehended from the above-mentioned explanation of FIG. 3. In respective resistance elements R, resistance changes corresponding to the above stresses are produced. For example, the resistance of resistance element Rx1 decreases (−), the resistance of resistance element Rx2 increases (+), and the resistance of resistance element Ry1 is unchanged (0). In addition, where moments about the X-axis and forces in the Z- axis direction as respectively indicated by arrows Mx and Fz of FIGS. 22 and 23 are applied, stresses as shown are produced.

Eventually, the relationship between moments or forces applied and changes of respective resistance elements is as shown in Table 3.

TABLE 3

|  | Mx | My | Fz |
|---|---|---|---|
| Rx1 | − | 0 | − |
| Rx2 | + | 0 | + |
| Rx3 | − | 0 | + |
| Rx4 | + | 0 | − |
| Ry1 | 0 | − | − |
| Ry2 | 0 | + | + |
| Ry3 | 0 | − | + |
| Ry4 | 0 | + | − |
| Rz1 | − | 0 | − |
| Rz2 | + | 0 | + |
| Rz3 | − | 0 | + |
| Rz4 | + | 0 | − |

When the fact that respective resistance elements R constitute bridge circuits as shown in FIG. 2 is taken into consideration, the relationship between applied forces and changes of respective voltage meters 51 to 53 is as shown in Table 4

TABLE 4

|  | My | Mx | Fz |
|---|---|---|---|
| VOLTAGE METER 51 | CHANGE | NO | NO |
| VOLTAGE METER 52 | NO | CHANGE | NO |
| VOLTAGE METER 53 | NO | NO | CHANGE |

It is to be noted that while resistance elements Rz1 to Rz4 undergo substantially the same stress changes as those of resistance elements Rx1 to Rx4, because they are different in their bridge construction, the voltage meters 51 and 53 respond differently from each other. Eventually, voltage meters 51, 52 and 53 respond to My, Mx and Fz, respectively. Although only presence and absence of changes in Table 4 are indicated, the polarities of changes are ruled by the direction of a moment or force applied, and quantities changed are ruled by the magnitude of a moment or force applied.

As just described above, the elementary sensor comprising semiconductor substrate 10 and first strain generative body 20 can used as a detector for detecting moments about the X- and Y-axes with respect to the working point P (while this sensor also has a function to detect a force exerted in the Z-axis direction in this embodiment, such a function is only an additional one from a viewpoint of the fundamental principle). In practice, since the working point P is the point on the semiconductor substrate, for example, an approach is employed to detect a moment exerted on a point within the working area 23 as the moment exerted on the working point P in place of detecting the moment directly exerted on the working point P.

2.4 Operation as the force detector

As previously described, the elementary sensor comprising semiconductor substrate 10 and first strain generative body 20 functions as a moment detector. By adding second strain generative body 30 thereto, the elementary sensor is permitted to function as a force detector.

FIG. 24 is a view for explaining the function as this force detector. FIG. 24(a) is a cross sectional view showing only the essential part of the detector shown in FIG. 20. In this example, the elementary sensor comprising semiconductor substrate 10 and first strain generative body constitutes a moment detector as previously described. The working point P of the first strain generative body 20 and the displacement point S of the second strain generative body 30 are spaced by the distance l along the arm like portion 33a as shown in FIG. 24(b). It is now assumed that the displacement point S is shifted to the position of the point S' by the force Fx parallel to the X-axis as shown in FIG. 24(c). As a result of this displacement, the second strain generative body 30 is bent as indicated by broken lines in the figure, with the result that moment My about the Y-axis is produced at the working point P. This moment can be detected as changes in the resistance values of resistance elements as described above. In short, it is possible to detect the force Fx exerted on the displacement point S as the moment My exerted on the working point P. Conversion between the force Fx and the moment My can be readily carried out by using the distance l as a parameter.

The merit of the force detector according to this invention is just this point. Namely, when combination (elementary sensor) of the semiconductor substrate 10 and the first strain generative body 20 is prepared, it can be constructed as a force detector by adding the second strain generative body 20 thereto. Accordingly, at the time point of manufacturing semiconductor substrates 10, semiconductor substrates to which the same patterning and the same bridge wiring are implemented can be mass-produced at all times without taking into consideration whether the elementary sensor is used as a moment detector or a force detector in future.

2.5 Embodiment in which opposite application is carried out

In the embodiments having been described until now, an application to mass-produce semiconductor substrates 10 functioning as the moment detector as a first step to further add second strain generative body 30 in the case of using them as the force detector is carried out. An application completely opposite to the above application may be carried out. Namely, at a first step, semiconductor substrates 10 functioning as the force detector are mass-produced, and second strain generative body 30 is then added thereto when used as the moment detector.

Figure 25A:
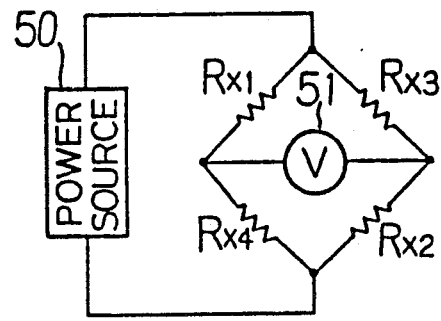
FIGS. 25(a), (b) and (c) are circuit diagrams showing a further bridge circuit applicable to the force/moment detector according to this invention, respectively.
Figure 25B:
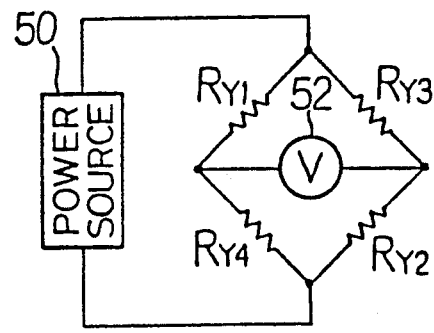
Figure 25C:
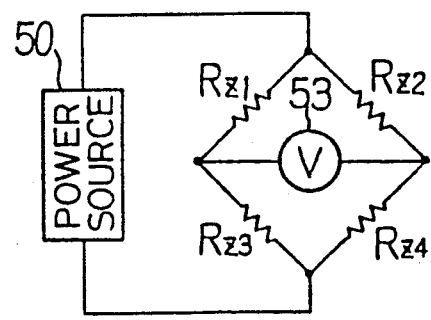

When bridge wiring shown in FIG. 25 is implemented to respective resistance elements R of the detector shown in FIG. 20 instead of the bridge wiring shown in FIG. 2, the semiconductor substrate 10 and the first strain generative body 20 will function as the force detector. It is to be noted that the bridge construction in respect of the resistance elements Rz is unchanged, but each bridge construction in respect of the resistance elements Rx and Ry is partially modified. Assuming that such bridges are constructed, when forces Fx, Fy and Fz in the X-, Y- and Z-axis directions are applied to the working point P, respective resistance elements undergo resistance changes as shown in Table 5. At this time, presence and absence of changes of voltages meters 51 to 53 are shown in Table 6.

TABLE 5

|     | Fx | Fy | Fz |
|-----|----|----|----|
| Rx1 | +  | 0  | −  |
| Rx2 | +  | 0  | +  |
| Rx3 | −  | 0  | +  |
| Rx4 | −  | 0  | −  |
| Ry1 | 0  | −  | −  |
| Ry2 | 0  | −  | +  |
| Ry3 | 0  | +  | +  |
| Ry4 | 0  | +  | −  |
| Rz1 | +  | 0  | −  |
| Rz2 | +  | 0  | +  |
| Rz3 | −  | 0  | +  |
| Rz4 | −  | 0  | −  |

TABLE 6

|                  | Fx     | Fy     | Fz     |
|------------------|--------|--------|--------|
| VOLTAGE METER 51 | CHANGE | NO     | NO     |
| VOLTAGE METER 52 | NO     | CHANGE | NO     |
| VOLTAGE METER 53 | NO     | NO     | CHANGE |

As just described above, the detector having the bridge construction as shown in FIG. 25 and comprising semiconductor substrate 10 and first strain generative body 20 can be used as a detector to detect forces in X-and Y-axis directions with respect to the working point P (while this detector has a function to detect a force exerted in the Z-axis direction in this embodiment, such a function is only an additional one from a viewpoint of the fundamental idea of this invention). In practice, because the working point P is a point on the semiconductor substrate, for example, an approach is employed to detect a force exerted on a point within the working area 23 as the force exerted on the working point P in place of detecting a force directly exerted on the working point P.

Figure 24A:
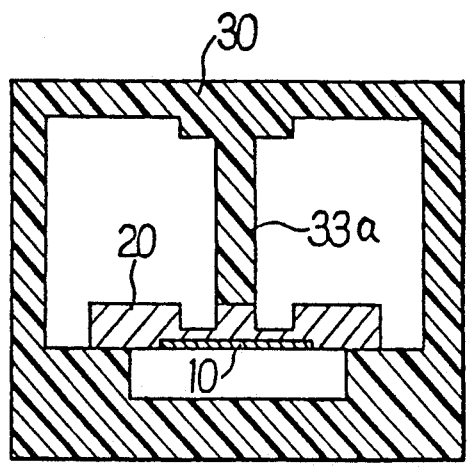
FIGS. 24(a) to (d) are diagrams showing the principle of operation of a force/moment detector according to this invention, respectively.
Figure 24B:
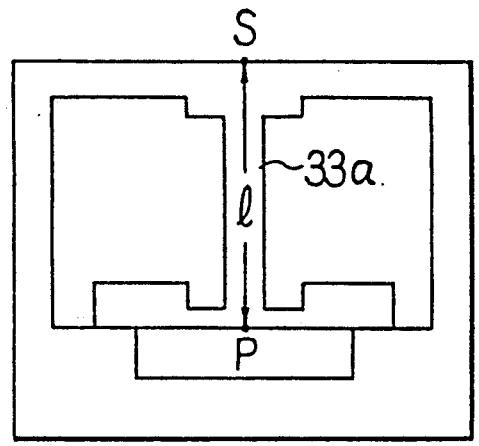
Figure 24C:
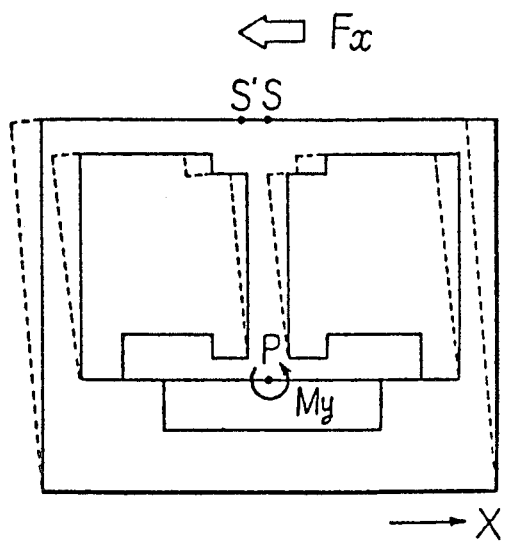
Figure 24D:
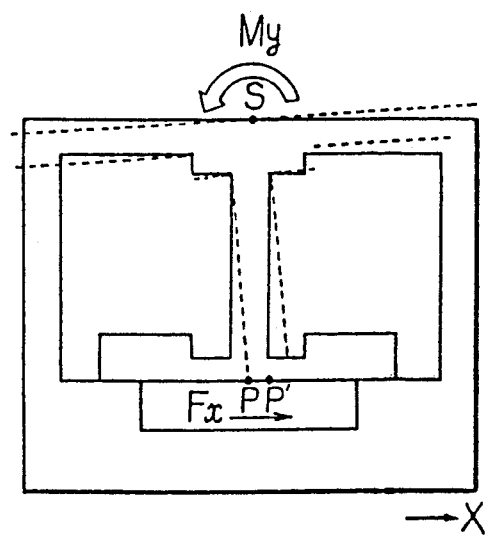

By adding second strain generative body 30 to the detector for detecting the force exerted on the working point P as stated above, it can be used as a moment detector. FIG. 24(d) is a view for explaining the function as the force detector. It is now assumed that the second strain generative body 30 is bent with the displacement point S being as a center by the moment My about the straight line passing through the displacement point S and parallel to the Y-axis. As a result, the second strain generative body 30 is bent as indicated by broken lines in the figure, with the result that the force Fx in the X-axis direction such that the working point P is moved to the point P′ is produced. This force Fx can be detected as the changes in the resistance values of the resistance element. In short, the moment exerted on the displacement point X can be detected as the force Fx exerted on the working point P. Conversion between the force Fx and the moment My can be readily carried out by using the distance l as a parameter.

2.6 Construction having a minimum number of resistance elements

In the above mentioned embodiments, it has been shown that twelve resistance elements Rx1 to Rz4 are formed on the semiconductor substrate 10. However, all of such resistance elements are not necessarily required. Particularly, since four resistance elements Rz1 to Rz4 are used for detecting the force in the Z-axis direction, they are unnecessary for detecting forces/moments with respect to X- and Y-axes. In the case of detecting the moment about the Y-axis exerted on the working point P on the semiconductor substrate 10, it is sufficient that there are two elements of resistance elements Rx1 and Rx3 as seen from the Tables 3 and 4. Further, in the case of detecting the force in the X-axis direction, it is sufficient that there are two elements of resistance elements Rx1 and Rx2.

2.7 Other embodiments

Although this invention has been described on the basis of the embodiment shown, it is not limited to the above-described embodiment, but may be applied in various manners.

For example, in the above-described embodiment, the central portion and the peripheral portion of the first strain generative body serve as the working portion and the supporting portion, respectively, and the central portion and the peripheral portion of the second strain generative body serve as the arm like body and the fixed portion, respectively. However, this invention is not limited to such a construction, but may be implemented with a relationship such that the central portion and the peripheral portion are reciprocal.

While resistance elements formed on the semiconductor substrate are used as the transducer in the above-mentioned embodiments, any means having a function to transform a mechanical transformation to an electric signal may be used as the transducer. For example, a sensor having a strain gauge may be applied for this purpose.

2.8 Advantages with the embodiment

As described above, in accordance with this invention, there is provided a detector comprising transducer for transforming a mechanical deformation to an electric signal, and strain generative body for allowing the transducer to carry out the strain generative operation, wherein an arm like body is affixed in a manner to extend from the working portion of the strain generative body, thus making it possible to transform a force or moment applied to the front end of the arm like body to a moment or force at the working portion. Thus, this detector may be applied both to the force sensor and to the moment sensor using the same transducer.

§3 Contact detector

An embodiment in which the elementary sensor according to this invention is applied to a contact detector will be now described.

3.0 Technical background

The contact detector disclosed here is suitable for detecting the coordinate of a contact point or the direction of a very small area of a contact point in the three-dimensional coordinate system when the detector comes in contact with an object.

In general, in the machine processing, the dimensional accuracy of products is the most important commercial value. For the purpose of making a dimensional measurement, various automatic measurement technologies have been conventionally developed and utilized. For example, an automatic sizing equipment utilizing an air micrometer, a touch sensor for measuring the dimension and the form of articles, and the like have been known. In this touch sensor, probe comes in contact with an article to trace on the surface of the article &o thereby measure the three-dimensional size and form of the article. The displacement that the probe has undergone is transformed to a signal of on/off switch.

Accordingly, the output signal is obtained as a digital signal of on/off, failing to conduct high accuracy detection. In addition, the direction of a very small area where the probe is in contact with an article cannot be also detected.

A contact detector described below has enabled high accuracy contact detection and detection of the contact surface azimuth of probe by the application of the above-described elementary sensor.

It is to be noted that the above-described six-axis component sensor may be used as the elementary sensor in the following embodiment.

3.1 First embodiment

Figure 26:
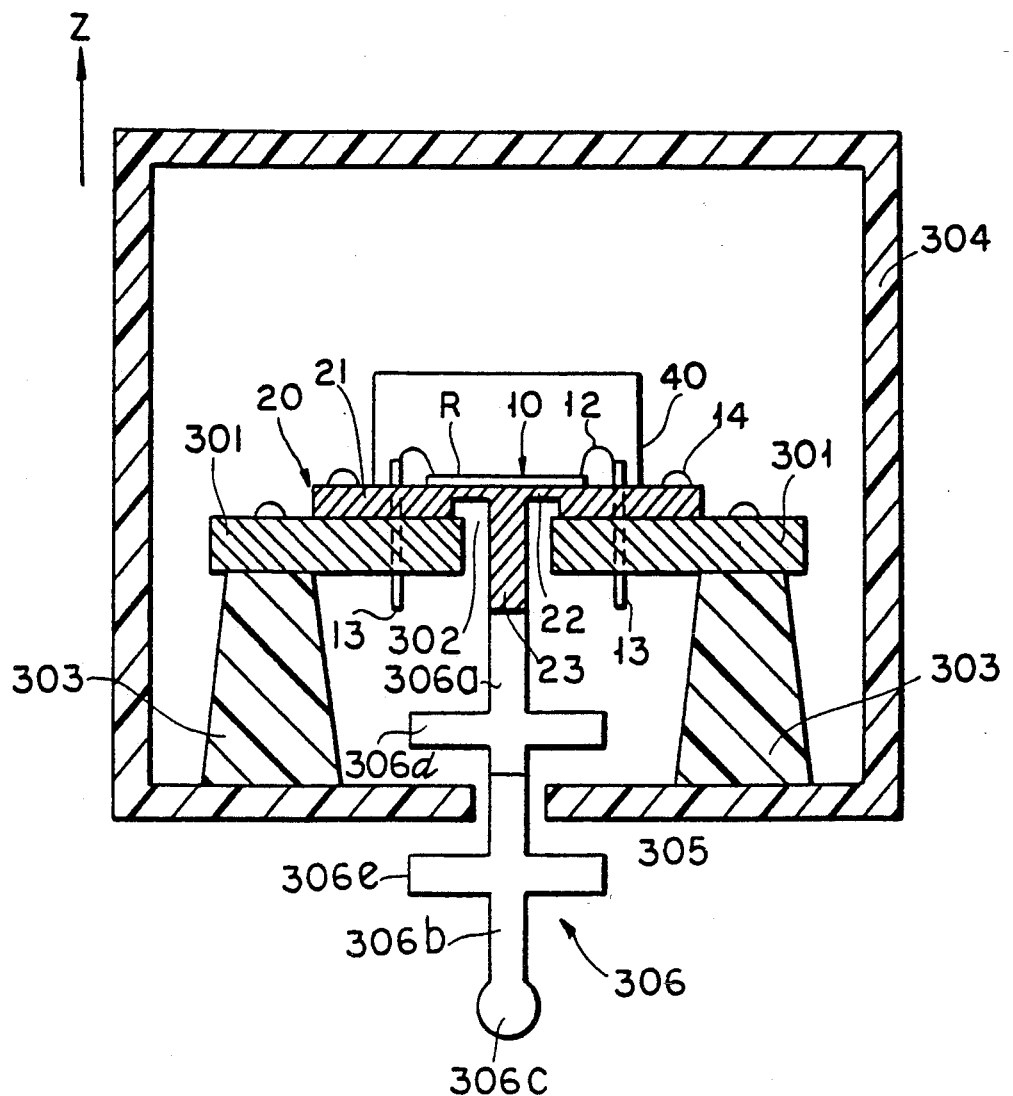
FIGS. 26 to 29 are cross sectional views of embodiments of a contact detector according to this invention, respectively.

The cross section of a first embodiment of a contact detector according to this invention is shown in FIG. 26, wherein the above-described elementary sensor comprising single crystal substrate 10 and strain generative body 20 is assembled in the central portion in the figure.

As previously described, the strain generative body 20 includes supporting portion 21, flexible portion 22, and working portion 23. Elements on the single crystal substrate 10 are connected to electrodes 13 by means of bonding wires 12, and wiring (not shown) is implemented from the external to the electrodes 13. Above the single crystal substrate 10, protective cover 40 is provided.

Such an elementary sensor is such that its supporting portion 21 is fixed on a table plate 301 by means of fixing screws 14. The table plate 301 is annular, and the working portion 23 is inserted through a penetration hole 302 in the center of the table plate 301. The table plate 301 is fixed to a body 304 through a pedestal 303 similarly formed annular. At the lower portion of the body 304, an opening 305 is provided, and a stylus 306 is inserted through the opening 305. The stylus 306 consists of an upper section 306a and a lower section 306b, the both sections being removably fitted by means of screws.

The stylus upper section 306a is fixed to the front end of the working portion 23 of the strain generative body 20. On the other hand, at the lower end of the stylus lower section 306b, a ball like contact portion 306c is provided. This stylus functions as a contact piece or contractor for an object. Namely, when an object comes in contact with the contact portion 306c, a displacement corresponding to the contact is produced at the working portion 23. Stoppers 306d and 306e are formed at the stylus upper section 306a and the stylus lower section 306b, respectively. These stoppers limit the displacement of the stylus 306 to protect the strain generative body 20.

It is now assumed that the contact portion 306c of the stylus 306 comes in contact with an object by moving the body 304. In this case, a force applied to the contact portion 306c by the contact with the object is transmitted to the working portion 23 through the stylus 306. It has been described as the operation of the elementary sensor that the three-dimensional direction and magnitude of a force or moment applied to the working portion 23 can be detected. Accordingly, the plane direction and the magnitude of a very small contact surface of an object in contact with the contact portion 306c can be electrically detected.

It is to be noted that while the stylus upper section 306a and the stylus lower section 306b are screw-connected in this embodiment, they may be connected by the plug-in method, on other removably fitting methods. Although it is not essential to this invention that the stylus 306 is thus divided into the upper and lower sections, it is preferable to divide the stylus into the upper and lower sections. This is because the lower section can be easily exchanged in the case where it is broken by the contact with the object.

3.2 Second embodiment

Figure 27:
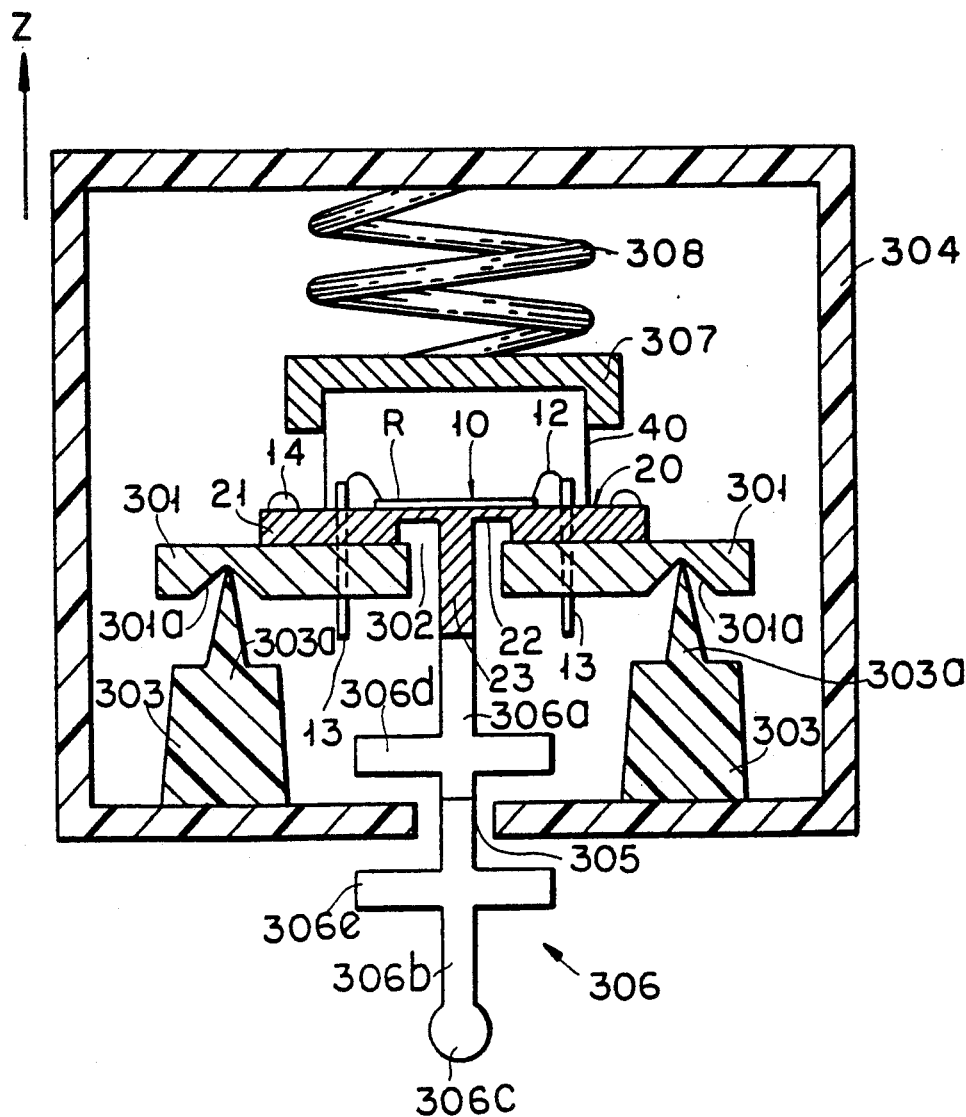

The cross section of a second embodiment of a contact detector according to this invention is shown in FIG. 27 wherein the same components as those in the first embodiment are designated by the same reference numerals, respectively. The feature of this embodiment is that the table plate 301 and the pedestal 303 are not fixed.

An annular edge 303a is formed at the upper surface of the pedestal 303, and this edge holds or retains from the downward direction an annular groove 301a V-shaped in cross section which is formed at the lower surface of the table plate 301. Moreover, a seat plate 307 is fixed above the protective cover, and a coil spring 308 is provided above the seat plate 307. In a normal state, the table plate 301 is pressed or thrust onto the upper surface of the pedestal 303 by the biasing force of the coil spring 308.

When the stylus 306 undergoes a force, a portion of the table plate 301 is away from the pedestal 303 in dependence upon the applied force. An arc-contact is produced at the contact portion of the table plate 301 and the pedestal 303. This arc-contact will be produced at an arbitrary portion. Irrespective of the fact that a force that the stylus 306 undergoes is in any direction, the direction of a strain produced in the flexible portion 22 of the strain generative body 20 will be in correspondence with the direction of a force that the stylus 306 has undergone. Accordingly, respective resistance elements R can transform the direction of a force that the stylus 306 has undergone to a precise electric resistance. Eventually, the direction of a force that the stylus 306 has undergone (the gradient and the coordinate of a very small area of an object which has come in contact) can be detected. Such a structure is effective in the case of using this detector as the profiling detector. Namely, an approach is employed to move the stylus 306 along the surface of the object with the contact portion 306c of the stylus 306 being caused to be in contact with the object while detecting a signal output from the bridge circuit. Since the output signal from the bridge circuit serves as information indicating the contact state at each moment, the dimention and the form of the object can be detected as the three-dimensional component with high accuracy. It is to be noted that the strain generative body 20 and the table plate 301 may be of a unitary structure. In addition, a plurality of projections arranged in an annular fashion may be used instead of the annular edge 303a.

3.3 Third embodiment

Figure 28:
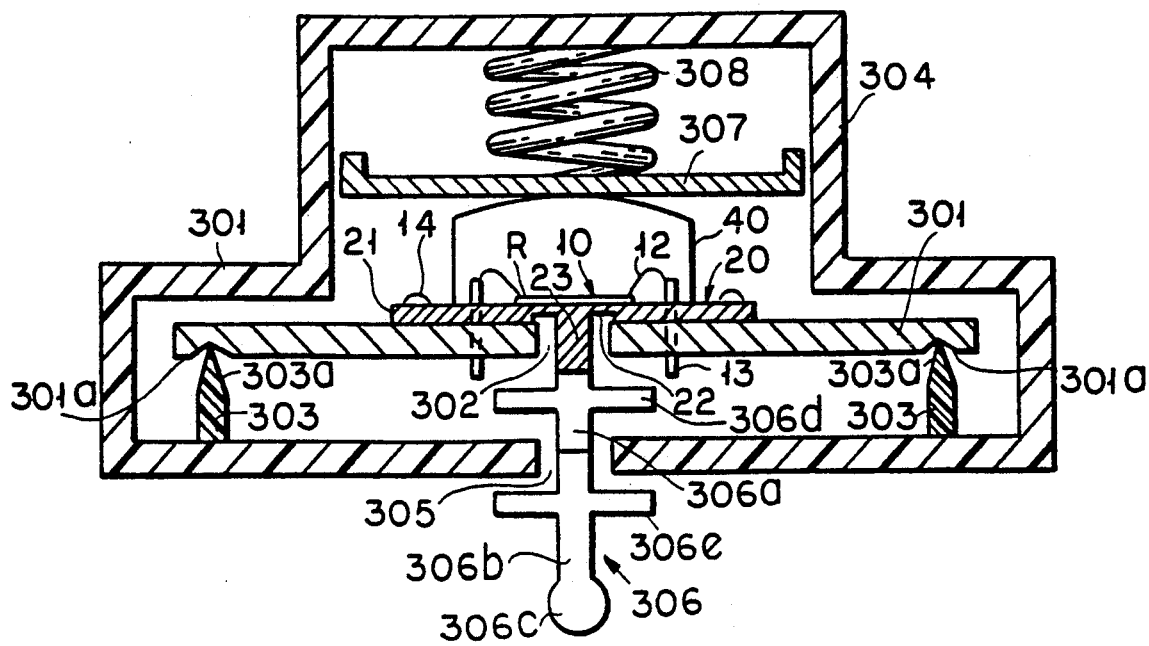

A third embodiment of a contact detector according to this invention is shown in FIG. 28. The feature of this detector resides in that the upper surface of the protective cover 40 is formed as a projecting curved surface.

When the stylus 306 undergoes a force as a result of the fact that it comes in contact with an object, the protective cover 40 experiences a displacement rotating right and left on the plane of paper. At this time, since the upper surface of the protective cover 40 is curved, the protective cover 40 acts so as to push or thrust up the table plate 307 against the spring force of the coil spring 308. At this time, since the seat plate 307 moves upwardly along the inside of the body 304, it serves as a guide. This structure is effective in the case of using this detector as a profiling detector.

3.4 Fourth embodiment

Figure 29:
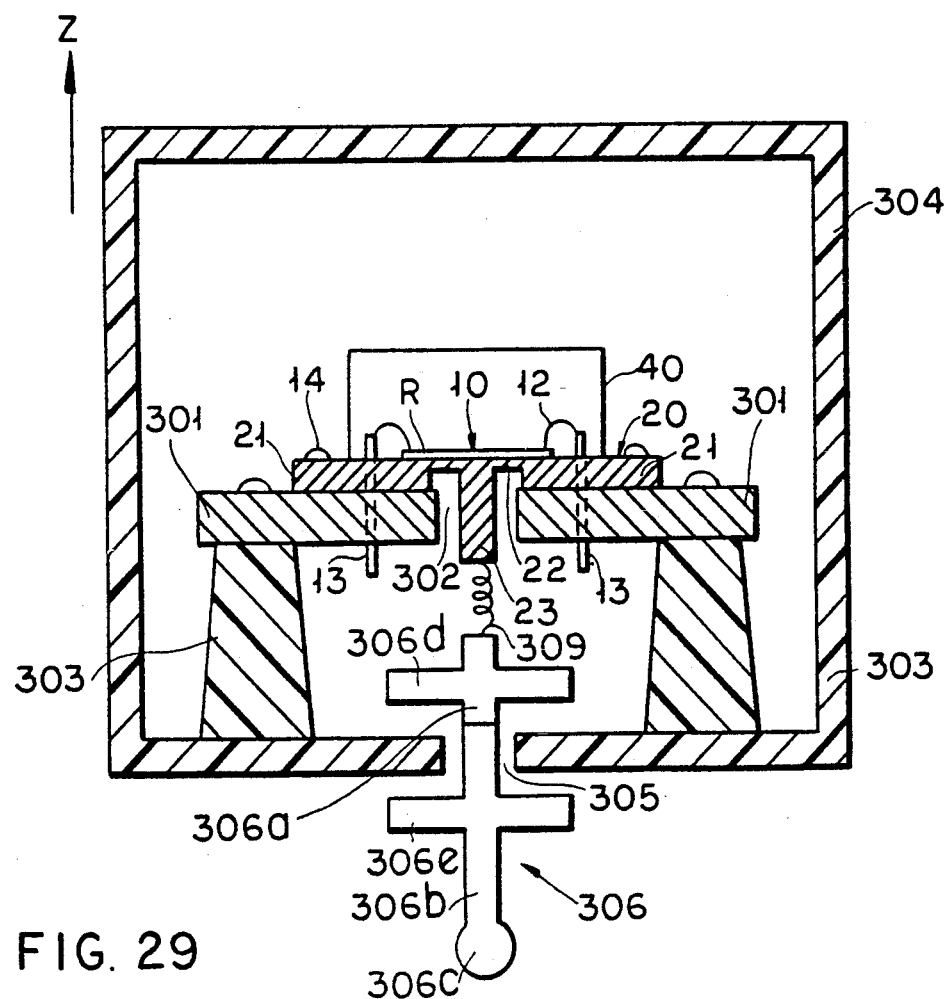

A fourth embodiment of a contact detector according to this invention is shown in FIG. 29. The feature of this detector resides in that stylus 306 is affixed to the working portion 23 of the strain generative body 20 through a coil spring 309. Such a device is effective for utilization as a profiling probe in the same manner as in the second and third embodiments. By the provision of the coil spring 309, a displacement, which is produced when the stylus 306 undergoes a force as a result of the fact that the stylus 306 comes in contact with an object, can be enhanced by the action of the spring force of the coil spring 309. It is to be noted that rubber or synthetic resin, etc. may be used in place of the coil spring 309. The above-mentioned second and third embodiments are principally suitable for detection of displacement along the XY plane, whereas this fourth embodiment can further cope with detection of displacement in the Z-axis direction as well.

3.5 Advantages with the embodiments

As described above, a contact detector according to this invention is constructed to allow the strain generative body to produce a mechanical deformation by a force that the contactor has undergone, and to transform this mechanical deformation to changes in the electric resistance values of resistance elements arranged so as to recognize the direction of the force applied to the contactor, thus making it possible to precisely change, to an electric signal, a force that the contactor has undergone as a result of the fact that it comes in contact with an object. Namely, the coordinate of the contact point that the contactor has come in contact with an object and the direction of the gradient, etc. of a very small surface of the contact point can be detected. Further, this detector can be utilized as a profiling probe for detecting the coordinates of the contact point and the direction of the gradient, etc. of a very small surface of the contact point while detecting output signals of resistance elements respectively arranged so as to recognize the direction of a force.

§4 Gripper for robot

Finally, an embodiment in which an elementary sensor according to this invention is applied to a gripper for robot will be described.

4.0 Technical background

Industrial robots are presently utilized in various fields. For the portion of the gripper which plays a role for actually holding a work of the robot, an operating control suitable for work is required. For example, in the case of the gripper using glass product as a work, a higher precision control is required as compared to the gripper using bolt/nut as a work.

For carrying out such a precise control, it is effective to affix a touch sensor to the gripper to detect adjustment of the gripping force, presence/absence of existence of work, or position of work, etc. Such a tactual sense is generally classified into sense of touch, sense of pressure, sense of force, and sense of sliding or slip, etc. For the sensor for sense of touch, microswitch, touch sensor, and the like are utilized. For the sensor for sense of pressure, or the sensor for sense of force, strain gauge, conductive rubber, or the like is utilized. In addition, for the sensor for sense of sliding, any effective sensor has not been developed for the time being because the slip on the surface has no directiveness.

On the other hand, while several touch sensors are utilized in conventional grippers for robot as described above, all of them have problems. Namely, with the sensor for sense of touch such as microswitch or touch sensor, presence and absence of contact can be only detected, but sense of pressure cannot be detected. Sensor for sense of pressure and/or sensor for sense of force such as strain gauge or conductive rubber have the drawback that the sensitivity is low, and no linear output can be obtained. As far as sensor for sense of slip concerned, it is the present stage that there is no effective sensor.

In view of this, an embodiment of a gripper for robot sensible with high accuracy, which is capable of sufficiently grasping the gripping state of work by using the above-described elementary sensor as the touch sensor, will be now described.

4.1 Construction of the gripper

Figure 30A:
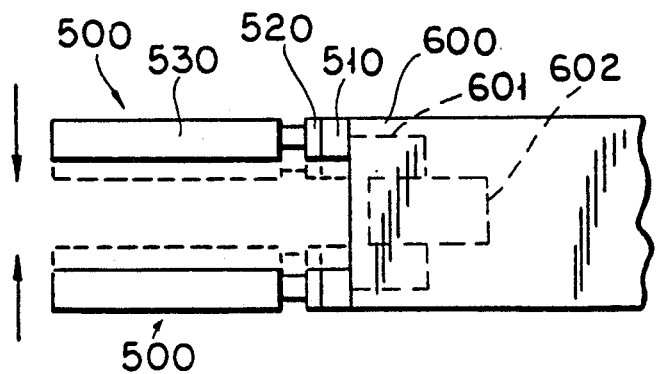
FIG. 30(a) is a front view of an embodiment of a gripper for robot according to this invention.
Figure 30B:
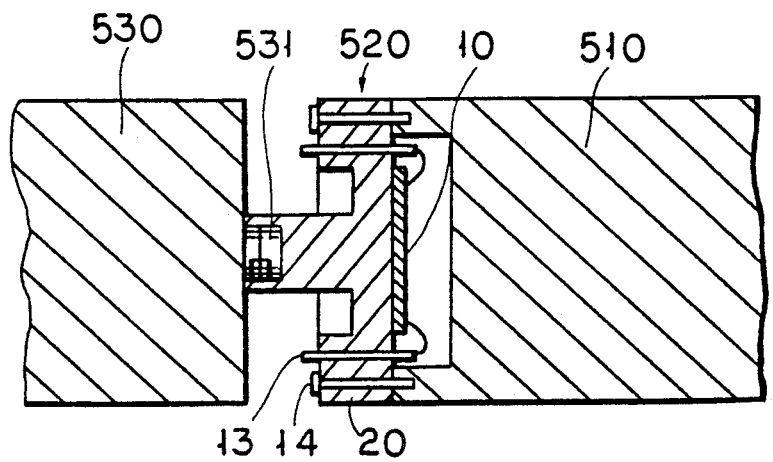
FIG. 30(b) is a cross sectional view thereof.

FIG. 30 is a view showing a gripper for robot according to an embodiment of this invention, wherein FIG. 30(a) is a side view of the gripper front end and FIG. 30(b) is a partially enlarged cross sectional view of FIG. 30(a). This gripper includes two finger members 500 for grasping work, and a hand member 600 for movably supporting the two finger members. These finger members 500 serve to slide relative to the hand member 600 as indicated by broken lines in the figure to hold a work therebetween. A link mechanism 601, and a hydraulic mechanism 602, etc. for driving the finger members 500 are provided within the hand member 600, but an explanation of these mechanisms is omitted here.

As shown in FIG. 30(b), each finger member 500 is composed of three portions of a first joint portion 510, an intermediate joint 520, and a second joint portion 530. The first and second joint portions 510 and 530 are comprised of a rigid body such as metal. The intermediate joint 520 is a touch sensor including as the main component single crystal substrate 10 and strain generative body 20. This portion corresponds to the above-described elementary sensor. In this chapter, the portion corresponding to the elementary sensor will be called touch sensor hereinafter. The peripheral portion (supporting portion) of the strain generative body 20 is affixed to the first joint portion 510 by means of screws 14, and &he second joint portion 530 is affixed to the central portion (working portion) by means of screw portions 531. Between the supporting portion at the periphery of the strain generative body 20 and the working portion in the center thereof, a thin flexible portion is formed. When a force is applied to the portion between the first and second joint portions 510 and 530, the flexible portion is bent, so that a displacement will be produced between the supporting portion and the working portion. By this displacement, a strain is produced in the single crystal substrate 10. Resistance elements are formed on the single crystal substrate 10, and electric resistance values of the resistance elements will change by the strain. Eventually, a force applied to the portion between the first and second joint portions 510 and 530 can be detected as changes of resistance values of the resistance elements on the single crystal substrate 10. An electric signal is taken out from the single crystal substrate 10 to the external through electrodes 13 for external wiring.

4.2 Operation of the gripper

Figure 31:
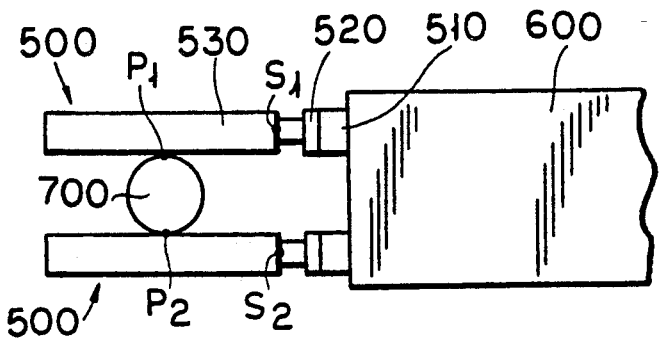
FIGS. 31 and 32 are diagrams for explaining the operation of the gripper shown in FIG. 30.

The operation of the gripper for robot provided with the touch sensor will be now described. FIG. 31 is a view showing that a work 700 is gripped by the gripper for robot. As described above, two finger members 500 are movably supported by the hand member 600, and the work 700 can be put between two finger members 500 so as to hold the work 700 from the both sides thereof. In this example, the work 700 comes in contact with the two finger members 500 at the contact points P1 and P2. For holding the work 700, force exist at the contact points P1 and P2. Namely, a force is applied to the working point S1 by the force produced at the contact point P1, and a force is applied to the working point S2 by the force produced at the contact point P2. As described above, the intermediate joint 520 constitutes a touch sensor and includes strain generative body 20. When a force is applied to &he working point, the strain generative body having flexibility is bent. Thus, the direction and the magnitude of the applied force will be taken out as respective electric signals. The touch sensor using single crystal substrate 10 can obtain an extremely high sensitivity linear output, and can calculate a correct value of the contact pressure to the work. As described above, since the touch sensor has a function to sense a force exerted on the contact point every components in the three-dimensional directions, it can also obtain information in respect of the direction along the plane of the work at the contact point.

Figure 32:
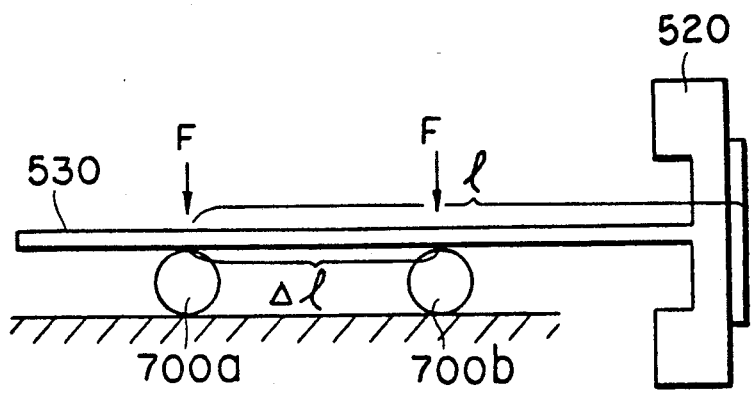

The physical quantity sensed by the touch sensor is actually a moment force. Now, in the model view as shown in FIG. 32, the case where work 700 is located at the position of 700a and the case where it is located at the position of 700b are assumed (Actually, work 700 is held between two finger members, but an attention is paid to only one of them for the brevity of explanation). In either case, when it is assumed that the second joint portion 530 holds down the work 700 by a fixed force F at all times, the moment force sensed by the intermediate joint (touch sensor) is expressed, with respect to the work 700a, as follows:

$$M(a) = K \times F \times l.$$

It is expressed, with respect to the work 700b, as follows:

$$M(b) = K \times F \times (l - \Delta l)$$

where K is a constant. Accordingly, even in the case where work 700, which is to have been held by the force F at the position of the distance l, slides and moves by the distance $\Delta l$, the distance $\Delta l$ that the work 700 has slid can be obtained by the computation on the basis of the above two equations. This function is just the function to measure sense of slip which could not been measured with the conventional sensor.

If the above-described six-axis component sensor is used as the intermediate joint, even in the case where the force holding down the work 700 changes, sense of slip can be measured. Namely, where the work 700a is held down by the force F1 and the work 700b is held down by the force F2, respective moment forces are expressed as follows:

$$M(a) = K \times F1 \times l$$
$$M(b) = K \times F2 \times (l - \Delta l).$$

Since the six-axis component sensor can individually sense M(a), M(b), F1, and F2, respectively, the distance $\Delta l$ that the work 700 has slid can be also computed on the basis of the above two equations.

Figure 33:
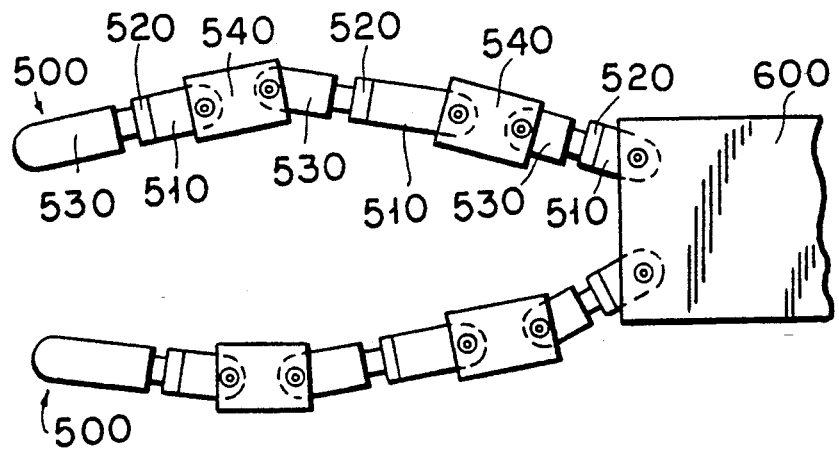
FIG. 33 is a diagram showing a modification of the gripper shown in FIG. 30.

FIG. 33 is a view showing an embodiment in which the finger member 500 is composed of a large number of joint sections. In the same manner as in the above-described embodiment, two finger member 500 is supported by the hand member 600. A first joint portion 510 is rotatably affixed to the hand member 600, an intermediate joint 520 is connected to the first joint portion 510, and a second joint portion 530 is connected to the intermediate joint 520. The second joint portion 530 is further rotatably connected to a drive intermediate joint portion 540. By repeatedly assembling the above-described respective members, the finger member 500 is constituted. In the drive intermediate portion 540, for example, a link mechanism, a hydraulic mechanism, and the like are provided. Thus, an angle between the first joint portions 510 and the second joint portion 530 can be adjusted. The gripper of such a structure permits the gripping operation more approximate to the finger of the human being, and can detect forces applied to respective joints by the plurality of intermediate joints 520.

4.3 Other embodiments

Figure 34A:
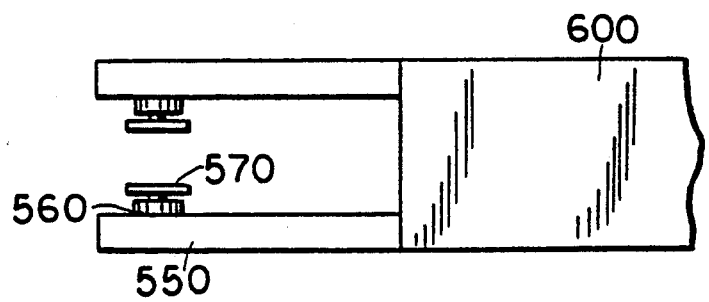
FIG. 34(a) is a front view of another embodiment of a gripper for robot according to this invention.
Figure 34B:
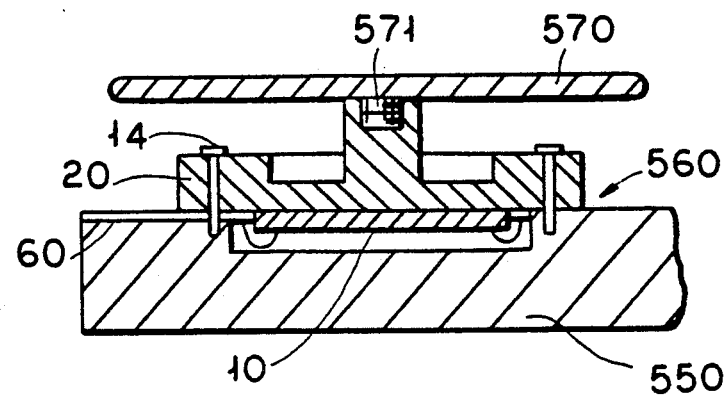
FIG. 34(b) is an enlarged cross sectional view thereof.

FIG. 34 is a view showing a gripper for robot according to another embodiment of this invention, wherein FIG. 34(a) is a side view of the gripper front end and FIG. 34(b) is a partial enlarged cross sectional view of FIG. 34(a). This gripper is the same as the above-described embodiment in that two finger members 550 are supported by the hand member 600, but differs from the latter in that a touch sensor 560 is formed on the work designation surface of the finger member 550. The touch sensor 560 is of the same construction as that of the touch sensor used as the intermediate joint 520, wherein the peripheral portion of the strain generative body is fixed to the finger members 550 by means of screws. In this embodiment, wiring between the single crystal substrate 10 and the external is implemented by a flexible printed board 60. A contact plate 570 is fixed to the central front end of the touch sensor by means of screw portions 571.

Figure 35:
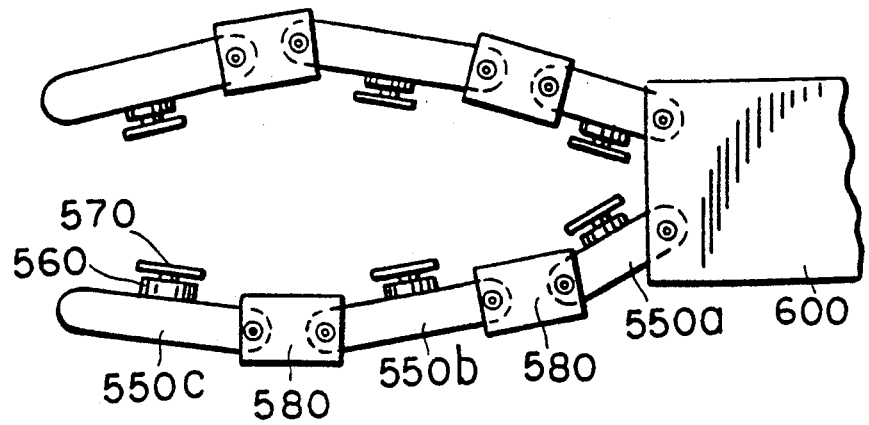
FIG. 35 is a diagram showing a modification of the gripper shown in FIG. 34.

As shown in FIG. 35, an approach may be employed to constitute the finger member 550 by a plurality of joint portions 550a to 550c and drive intermediate joint portions 580 connecting them to approximate to the operation of the finger of the human being. When touch sensors are arranged in &his way, contact pressures at respective portions can be sensed as electric signals. Further, sense of slip can be also sensed in the same manner as in the above-described embodiment. Namely, as shown in FIG. 36(a), when the work 700 is located at the position of 700a, since it comes in contact with the contact plate 570 at the contact point P1, the single crystal substrate 10 of the touch sensor 560 will sense moment M1 as shown. On the contrary, as shown in FIG. 36(b), when the work 700 is located at the position of 700b, since it comes in contact with the contact plate 570 at the contact point P2, the single crystal substrate 10 of the touch sensor 560 will sense the moment force M2 as shown. Accordingly, when the work 700 has slid from the position 700a to the position 700b, this can be recognized on the basis of changes of values sensed.

4.4. Detection of sense of slide in the case where an acceleration is exerted Where an acceleration is exerted, detection of sense of slide can be made by using a three-dimensional acceleration sensor in combination. The principle thereof will be described with reference to FIG. 37. It is now assumed that work 700 of mass m is gripped as shown. It is further assumed that the gravity G and the contact point P of the work 700 are both on the central axis of the touch sensor 560 for simplification of the model. It is furthermore assumed that the contact plate 570 hold down the work 700 by the force F. In this case, the force Fv in a vertical direction exerted on the contact point P is expressed as follows:

$$Fv = mg/2,$$

and, the force Fh in a horizontal direction exerted thereon is expressed as follows:

$$Fh = F$$

where g is acceleration of gravity.

It is now assumed that the entirety of this system is embarked on a vehicle, or in a similar state, and an acceleration in a vertical direction is exerted. In this case, the forces exerted on the contact point P are expressed with prime as follows:

$$Fv' = m(g + \alpha)/2$$
$$Fh' = F$$

Forces exerted on the contact point P in the case where slide is further produced in a vertical direction are expressed with double primes as follows:

$$Fh'' = Fh' = F$$
$$Fv'' \neq Fv'.$$

Since the force exerted on the contact point P can be detected by the touch sensor 560, if it can be recognized that $Fv'' \neq Fv'$, even under condition where an acceleration is exerted, presence and absence of sliding can be judged.

For detecting an acceleration α exerted, any three-dimensional acceleration sensor may be utilized. In the example shown in FIG. 37, an acceleration sensor 800 is used. This acceleration sensor is substantially the same structure as that of the above-described sensor. Namely, single crystal substrate 10 is formed on strain generative body 20, and the stress produced in the strain generative body 20 can be detected as changes of electric resistance on the single crystal substrate. It is to be noted here that a weight body 70 is connected to the front end of the working portion in the center of the strain generative body 20, and the supporting portion of the peripheral portion of the strain generative body 20 is fixed to the gripper body 900 by means of the supporting table 80. Moreover, a cover 90 for protection is fitted above the gripper body 900. When an acceleration is exerted, because a force is exerted to the weight body 70, this can be detected as changes in the electric resistance of the resistance elements on the single crystal substrate.

4.5 Advantages with the invention

As stated above, a gripper for robot in accordance with this invention is constructed so that a touch sensor comprising resistance elements provided on the single crystal substrate, and &he strain generative body for allowing the resistance elements to produce a mechanical deformation is affixed thereto, thus permitting a high accuracy control capable of sufficiently grasping the gripping state of the work.

INDUSTRIAL APPLICABILITY

The force detectors and the force/moment detectors disclosed in this specification can be utilized as sensor in every field. Especially, application to industrial robots is expected, it can be said that the contact detectors or grippers for robot disclosed in this specification are the typical example thereof.

I claim:

1. A contact detector comprising:
   a contact piece for contacting an object;
   a strain generative body for transforming a force applied to said contact piece due to contact with an object to a mechanical deformation;
   a semiconductor substrate connected to said strain generative body, said substrate including resistance elements having a resistance value varying on the basis of a mechanical deformation transformed by said strain generative body;
   said strain generative body being made of a material different from said semiconductor substrate;
   an enclosure for containing said strain generative body and said semiconductor substrate, an object contacting end of said contact piece protruding outwardly from said enclosure; and
   supporting means for supporting said strain generative body within said enclosure;
   said substrate having a flat surface, and wherein an XYZ three-dimensional coordinate system is defined including orthogonal X and Y axes lying in said flat surface and intersecting each other at an origin of said system, wherein said resistance elements are located on an XY plane of the coordinate system, said semiconductor substrate comprising first bridging portions (214, 215) formed along the X-axis on respective both sides of the origin of the coordinate system and second bridging portions (212, 213) formed along the Y-axis on respective both respective both sides of the origin, said first and second bridging portions being fixed to said strain generative body so that strains are produced in said respective bridging portions by applying a force to said contact piece; and
   wherein resistance element groups (R) comprising a plurality of said resistance elements are provided on the XY plane of said first and second bridging portions at principal positions as follows:
   a) a pair of positions for resistance elements (R13, R15) arranged on both sides of the X-axis in respective positive and negative directions of the Y-axis in the vicinity of said origin in the positive direction of said X-axis,
   b) a pair of positions for resistance elements (R10, R12)) arranged on both sides of said X-axis in respective positive and negative directions of said Y-axis in the vicinity of said origin in the negative direction of said X-axis, c) a pair of positions for resistance elements (R14, R16) arranged on both sides of said X-axis in respective positive and negative directions of said Y-axis in the vicinity of said fixed portion in the positive direction of said X-axis, d) a pair of positions for resistance elements (R9, R11) arranged on both sides of said X-axis in respective positive and negative directions of said Y-axis in the vicinity of said fixed portion in the negative direction of said X-axis, e) a pair of positions for resistance elements (R5, R7) arranged on both sides of said Y-axis in respective positive and negative directions of said X-axis in the vicinity of said origin in the positive direction of said Y-axis, f) a pair of positions for resistance elements (R2, R4) arranged on both sides of said Y-axis in respective positive and negative directions of said X-axis in the vicinity of said origin in the negative direction of said Y-axis, g) a pair of positions for resistance elements (R6, R8) arranged on both sides of said Y-axis in respective positive and negative directions of said X-axis in the vicinity of said fixed portion in the positive directions of said Y-axis, and h) a pair of positions for resistance elements (R1, R3) arranged on both sides of said Y-axis in respective positive and negative directions of said X-axis in the vicinity of said fixed portion in the negative direction of said Y-axis.

2. A contact detector comprising:

a contact piece for contacting an object;

a strain generative body for transforming a force applied to said contact piece due to contact with an object to a mechanical deformation;

a semiconductor substrate connected to said strain generative body, said substrate including resistance elements having a resistance value varying on the basis of a mechanical deformation transformed by said strain generative body;

said strain generative body being made of a material different from said semiconductor substrate;

an enclosure for containing said strain generative body and said semiconductor substrate, an object contacting end of said contact piece protruding outwardly from said enclosure; and supporting means for supporting said strain generative body within said enclosure;

wherein two sets, each comprising four of said resistance elements, are provided for detecting a component of contact along a respective one of at least two axes of a three-dimensional coordinate system; and wherein said strain generative body includes a supporting portion secured to said enclosure by said supporting means, a working portion for receiving a force applied to said contact piece, and a flexible portion provided between an interconnecting said supporting portion and said working portion.

3. A contact detector as set forth in claim 2, wherein said working portion and said contact piece are resiliently connected.

4. A contact detector as set forth in claim 2, wherein said supporting means includes a supporting body fixed to said enclosure and having at least three supporting points on a surface thereof, a table plate supported by said supporting points, and a resilient member pressing said table plate toward said supporting points.

5. A contact detector as set forth in claim 2, wherein said supporting means includes a pedestal fixed to said enclosure and having an annular supporting edge on a surface thereof, a table plate having an annular groove in a first surface thereof, said plate being mounted on said supporting means by means of said annular edge extending into and contacting a surface of said annular groove;

and supporting portion of said strain generative body contacting a second surface of said table plate oppositely disposed to said first surface thereof, and a resilient member pressing said table plate toward said supporting edge.

* * * * *

UNITED STATES PATENT AND TRADEMARK OFFICE
CERTIFICATE OF CORRECTION

PATENT NO. : 5,263,375
DATED : November 23, 1993
INVENTOR(S) : Kazuhiro OKADA

It is certified that error appears in the above-identified patent and that said Letters Patent is hereby corrected as shown below:

On title page, left column, item 30 "Sep. 18, 1988" should be -- Sep. 18, 1987 -- and "63-234589" should be -- 62-234589 --.

Signed and Sealed this

Twenty-eighth Day of June, 1994

Attest:

BRUCE LEHMAN

Attesting Officer    Commissioner of Patents and Trademarks